(12) United States Patent
Emerick et al.

(10) Patent No.: US 8,195,525 B2
(45) Date of Patent: *Jun. 5, 2012

(54) METHOD AND APPARATUS UPGRADE ASSISTANCE USING CRITICAL HISTORICAL PRODUCT INFORMATION

(75) Inventors: Earl Walter Emerick, Rochester, MN (US); Lonny R. Olson-Williams, Rochester, MN (US); Van Dee Sammons, Marietta, GA (US); Kurt Clifford Thompson, Rochester, MN (US); Paul William Wertzler, Rochester, MN (US); Ronald Dean Young, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 1121 days.

This patent is subject to a terminal disclaimer.

(21) Appl. No.: 11/854,238

(22) Filed: Sep. 12, 2007

(65) Prior Publication Data
US 2007/0299741 A1 Dec. 27, 2007

Related U.S. Application Data

(63) Continuation of application No. 09/865,371, filed on May 25, 2001, now Pat. No. 7,366,685.

(51) Int. Cl.
*G06Q 30/00* (2006.01)
(52) U.S. Cl. .................. 705/26.41; 705/26.7; 705/26.8; 705/27.1
(58) Field of Classification Search .................. 705/26, 705/27
See application file for complete search history.

(56) References Cited

U.S. PATENT DOCUMENTS

| | | | |
|---|---|---|---|
| 4,905,171 A | 2/1990 | Kiel et al. | |
| 5,408,618 A | 4/1995 | Aho et al. | |
| 5,627,766 A | 5/1997 | Beaven | |
| 5,668,944 A * | 9/1997 | Berry | 714/47.2 |
| 5,668,995 A * | 9/1997 | Bhat | 718/104 |
| 5,675,510 A | 10/1997 | Coffey et al. | |
| 5,696,701 A | 12/1997 | Burgess et al. | |
| 5,704,031 A | 12/1997 | Mikami et al. | |
| 5,758,071 A | 5/1998 | Burgess et al. | |

(Continued)

FOREIGN PATENT DOCUMENTS
GB 2357679 A 6/2001

OTHER PUBLICATIONS

"Performance Management/400 Offerings and Services, including Performance Management/400—Subset," Sep. 1994, International Business Machines Corporation, Third Edition, Version 3.

(Continued)

*Primary Examiner* — Robert M. Pond
(74) *Attorney, Agent, or Firm* — Patterson & Sheridan LLP

(57) ABSTRACT

Embodiments of the present invention provide an integrated methodology that simplifies upgrade choices for complex computer products through the use of automation and integration of product monitoring and business applications with, for example, web based capabilities. Historical information for computer systems is collected and transmitted to a remote support system. Over time, sufficient historical data provides a historical view of the systems indicative of usage and facilitating the choice of product enhancements, upgrades and customization. Further, this historical view may be integrated with the advances in the product that are kept by the remote support system as well as with the performance requirements of third party application providers.

25 Claims, 35 Drawing Sheets

U.S. PATENT DOCUMENTS

| | | | |
|---|---|---|---|
| 5,761,380 A * | 6/1998 | Lewis et al. | 706/47 |
| 5,787,409 A | 7/1998 | Seiffert et al. | |
| 5,796,633 A | 8/1998 | Burgess et al. | |
| 5,826,000 A | 10/1998 | Hamilton | |
| 5,828,899 A | 10/1998 | Richard et al. | |
| 5,848,231 A | 12/1998 | Teitelbaum et al. | |
| 5,918,019 A | 6/1999 | Valencia | |
| 5,926,624 A | 7/1999 | Katz et al. | |
| 5,949,976 A | 9/1999 | Chappelle | |
| 5,961,596 A | 10/1999 | Takubo et al. | |
| 6,059,842 A * | 5/2000 | Dumarot et al. | 717/153 |
| 6,098,098 A | 8/2000 | Sandahl et al. | |
| 6,130,892 A | 10/2000 | Short et al. | |
| 6,138,249 A | 10/2000 | Nolet | |
| 6,167,383 A * | 12/2000 | Henson | 705/26 |
| 6,170,060 B1 | 1/2001 | Mott et al. | |
| 6,192,403 B1 | 2/2001 | Jong et al. | |
| 6,247,128 B1 | 6/2001 | Fisher et al. | |
| 6,289,462 B1 | 9/2001 | McNabb et al. | |
| 6,321,338 B1 | 11/2001 | Porras et al. | |
| 6,510,463 B1 | 1/2003 | Farhat et al. | |
| 6,542,854 B2 * | 4/2003 | Yang et al. | 702/186 |
| 6,591,418 B2 | 7/2003 | Bryan et al. | |
| 6,618,370 B1 | 9/2003 | Malik | |
| 6,643,654 B1 | 11/2003 | Patel et al. | |
| 6,643,696 B2 | 11/2003 | Davis et al. | |
| 6,645,077 B2 | 11/2003 | Rowe | |
| 6,654,891 B1 | 11/2003 | Borsato et al. | |
| 6,704,877 B2 | 3/2004 | Cline et al. | |
| 6,708,155 B1 | 3/2004 | Honarvar et al. | |
| 6,711,676 B1 | 3/2004 | Zomaya et al. | |
| 6,714,976 B1 | 3/2004 | Wilson et al. | |
| 6,775,699 B1 | 8/2004 | DeLuca et al. | |
| 6,792,455 B1 | 9/2004 | DeLuca et al. | |
| 6,798,997 B1 | 9/2004 | Hayward et al. | |
| 6,813,248 B1 | 11/2004 | Boss et al. | |
| 6,845,306 B2 | 1/2005 | Henry et al. | |
| 6,898,556 B2 * | 5/2005 | Smocha et al. | 702/186 |
| 6,912,481 B2 | 6/2005 | Breunissen et al. | |
| 6,990,532 B2 | 1/2006 | Day et al. | |
| 7,016,972 B2 | 3/2006 | Bertram et al. | |
| 7,117,355 B2 | 10/2006 | Zomaya et al. | |
| 7,146,336 B2 | 12/2006 | Olsen et al. | |
| 7,185,093 B2 | 2/2007 | Bartley et al. | |
| 7,277,938 B2 | 10/2007 | Duimovich et al. | |
| 7,366,685 B2 | 4/2008 | Emerick et al. | |
| 2001/0001146 A1 * | 5/2001 | Petersen | 705/26 |
| 2001/0029526 A1 | 10/2001 | Yokoyama et al. | |
| 2003/0005075 A1 | 1/2003 | Bartley et al. | |
| 2003/0009385 A1 | 1/2003 | Tucciarone et al. | |
| 2003/0177160 A1 | 9/2003 | Chiu et al. | |
| 2004/0122730 A1 | 6/2004 | Tucciarone et al. | |
| 2005/0066019 A1 | 3/2005 | Egan et al. | |

OTHER PUBLICATIONS

Emil Abrascid, "Data Manager Online," Copyright 1999.

"IBM e-business on demand: the next wave of IT Services by IBM Global Services," Jan. 2002.

* cited by examiner

*← 1600*

```
[navigation icons]
ADDRESS
```

| End |
| End |
| End |
| End |
| Total |
| End |

RCHASA28

1 System Information:

12 months of
PM/400 data
available

*1602*

| Serial: | 10-3LOTM |
| Model: | S40-2208 |
| Feature: | |
| System CPU: | 87.0%of 4,550CPW |
| Interactive CPU: | 2.3% of 120CPW |
| # of Processors: | 12 |
| Memory: | 24576MB |
| Disk Arms: | 3.0%utilization of 228 Arms installed |
| Disk Arms Distribution: | 7,200 RPM Arms  228.0 |
| | 10k RPM Arms    0.0 |
| Disk Storage: | 966.6GB (72.6%) of 1.331GB |
| Data Protection: | No Protection |

*← 1604*

2. Growth Information Months to Grow:

12  *— 1606*

*← 1612*

Memory Growth Matches

*1608* {
| Interactive CPU: | -0.232 | — 1610A | CPW/Months ○ |
| NonInteractive CPU | 87.549 | — 1610B | CPW/Months ○ |
| Total System CPU: | 87.317 | — 1610C | CPW/Months ◉ |
| Disk Arms: | - 4 | — 1610D | CPW/Months ○ |
| Disk Storage: | 17 | — 1610E | CPW/Months ○ |
| Memory: | 471 | — 1610F | CPW/Months ○ |

*Fig. 16*

| System | $ Upgrade Price | Processor CPW | Interactive CPW | Mail Users | Mail &Cal Users | n-way | Software Tier | Disk GB | Upgrade |
|---|---|---|---|---|---|---|---|---|---|
| 830_2403_1532 | | 7350 | 120 | - | 20910 | 8 | P50 | 11055 | 11 |
| 830_2403_1533 | 82,500 | 7350 | 240 | - | 20910 | 8 | P50 | 11066 | 11 |
| 830_2403_1534 | 258,500 | 7350 | 560 | - | 20910 | 8 | P50 | 11055 | 11 |
| 830_2403_1536 | 495,000 | 7350 | 1050 | - | 20910 | 8 | P50 | 11056 | 11 |
| 840_2418_1540 | 273,728 | 10000 | 120 | - | 28430 | 12 | P40 | 16832 | 7 |
| 840_2418_1541 | 356,228 | 10000 | 240 | - | 28430 | 12 | P50 | 16852 | 7 |
| 840_2418_1542 | 532,228 | 10000 | 560 | - | 28430 | 12 | P50 | 18952 | 7 |
| 840_2418_1543 | 768,728 | 10000 | 1050 | - | 28430 | 12 | P50 | 18952 | 8 |
| 840_2420_1540 | 766,728 | 16500 | 120 | - | 55610 | 24 | P40 | 18952 | 3 |
| 840_2420_1541. | 849,228 | 16500 | 240 | - | 55610 | 24 | P50 | 18952 | 3 |
| 840_2420_1542 | 1,025,228 | 16500 | 560 | - | 55610 | 24 | P50 | 18952 | 3 |
| 840_2420_1543 | 1,261,728 | 16500 | 1050 | - | 55610 | 24 | P50 | 18952 | 4 |
| 840_2461_1540 | 1,078,028 | 20200 | 120 | - | 77800 | 24 | P40 | 18952 | 3 |
| 840_2461_1541. | 1,160,528 | 20200 | 240 | - | 77800 | 24 | P50 | 18952 | 3 |
| 840_2461_1542 | 1,336,528 | 20200 | 560 | - | 77800 | 24 | P50 | 18952 | 3 |
| 840_2461_1543 | 1,573,028 | 20200 | 1050 | - | 77800 | 24 | P50 | 18952 | 4 |

*Fig. 19*

IBM

$82,600.00 (US lot price) assumes a minimally operational machine.

vSr1..> vSr1 upgrade

From 830_2403_1532
    8406 ISeries 400 Model 830 System Unit
    2403 Model 830 Processor
    1532 Interactive Capacity Card
To   830_2403_1633
    9406 ISeries 400 Model 830 System Unit
        Conversion
    1533 Interactive Capacity Card    $82,500.00
        Carry Over 2403 Model 830 Processor
    0041 Device Parity Protection-All
    0367 Operations Conecte PCI Cable
    1454 200V 14FT Locking Line Card
    2881 Main Storage Expansion
    3082 129MB Main Storage
4X   4317 8.58GB 10k rpm Disk Unit
    4425 CD-ROM (PCI)
    4745 PCI WAN IDA
    5544 Sys Console on OP Console
    9074 Base I/O Enclosure
    9732 Base HSL Ports- 8 Copper
    9748 Base PCI Disk Unit Ctr
    9771 Base PCI 2-Line WAN w/Modem
    9843 Base PCI IQP
        TOTAL $82,500.00

Any prices or configurations provided are intended for planning purposes only and are not a commitment by IBM.

Call me now

*Fig. 20*

| | INDIVIDUAL ITEMS | | | | | |
|---|---|---|---|---|---|---|
| Qty | Part No. | Description | Available | Item Price | Line Total | |
| 1 | 9406-8XX-5079 | 1.8m I/O Tower | | $56,600.00 | $56,600.00 | Remove |
| 1 | 9406-8XX-5101 | 30-Disk Expansion Feature | | $9,000.00 | $9,000.00 | Remove |
| 1 | 9406-840-5150 | Battery Backup (External) | | $2,500.00 | $2,500.00 | Remove |
| 1 | 9406-8XX-2685 | 1063 Mbps OptiConnect Receiver, 830/840 - for initial & MES upgrade orders, 820 - for field upgrade (MES) orders only | | $5,000.00 | $5,000.00 | Remove |
| 1 | 9406-820-5157 | Feature Power Supply | | $1,950.00 | $1,950.00 | Remove |
| 1 | 9406-820-7127 | DASD Expansion Unit ( 820 Only) | | $850.00 | $850.00 | Remove |
| 4 | 9406-8XX-2796 | 256 MB Netfinity IOP Memory 850 MHz PCI for i Series 820,830, 840,SB2, SB3 | | $805.00 | $3,200.00 | Remove |
| 1 | 9406-8XX-2797 | 1 GB Netfinity IOP Memory 850 MHz PCI for i Series 820,830, 840,SB2, SB3 | | $6,995.00 | $6,995.00 | Remove |
| 6 | 9406-8XX-4318 | 17.54GB 10k rpm Disk Unit ( Ultra-2 SCSI) | | $2,520.00 | $15,120.00 | Remove |
| 4 | 9406-8XX-4331 | 1.6GB Read Cache Device | | $37,000.00 | $148,000.00 | Remove |
| 1 | 9406-8XX-2748 | PCI RAID Disk Unit Ctlr | | $6,000.00 | $6,000.00 | Remove |

Subtotal $255,235.00* Recalculate

*Fig. 22*

| KEY | VALUE | DESCRIPTION |
|---|---|---|
| MTM | 9406170 | MACHINE TYPE MODEL |
| SN | 0012345 | SERIAL NUMBER |
| VPD | 01/02/07 | VITAL PRODUCT DATA |
| CFG | 00110031 | CONFIGURATION LEVEL |
| T, 5065 | 01C00 | KEY = TOWER . TOWERTYPE<br>VALUE = TOWER LOCATION |
| FC 2722<br>O. 5065 . 02L01 . CC08 | 2722<br>2721 | TYPE . TOWERTYPE . TOWERLOCATION . SLOTLOCATION |
| MSG | | START OF CONFIGURATION MESSAGES |
| END | | END OF CONFIGURATION MESSAGES |

Fig. 26A

| KEY | VALUE | DESCRIPTION |
|---|---|---|
| MTM | 9406170 | MACHINE TYPE MODEL |
| SN | 0012345 | SERIAL NUMBER |
| VPD | 01/02/07 | VITAL PRODUCT DATA |
| CFG | 00110031 | CONFIGURATION LEVEL |
| T, 5065 | 01C00 | KEY = TOWER . TOWERTYPE<br>VALUE = TOWER LOCATION |
| N. 5065 . 02L01 . CC09<br>O. 5065 . 02L01 . CC08 | 2722<br>2721 | TYPE . TOWERTYPE . TOWERLOCATION . SLOTLOCATION |
| MSG | | START OF CONFIGURATION MESSAGES |
| END | | END OF CONFIGURATION MESSAGES |

Fig. 26B

IBM

PHYSICAL DEVICE PLACEMENT ASSISTANT

SPECIFY iSERIES OR AS/400 SYSTEM INFORMATION

○ ENTER SYSTEM:
● SELECT BASE SYSTEMS:
○ MACHINE EQUIPMENT SPECIFICATION (MES) NUMBER:

[10 ▽] — 2704    [____] — 2706 (PLANT CODE- SERIAL NUMBER)

MACHINE TYPE: [9406 ▽] — 2708

USER TYPE: [CUSTOMER ▽] — 2710

[SUMMIT SYSTEM INFORMATION] — 2712

*Fig. 27*

PHYSICAL DEVICE PLACEMENT ASSISTANT

SPECIFY iSERIES OR AS/400 SYSTEM INFORMATION

○ ENTER SYSTEM:
● SELECT BASE SYSTEMS:
○ MACHINE EQUIPMENT
SPECIFICATION (MES)
NUMBER:

9406: 10-170BS ▽  (MACHINE TYPE: PLANT CODE-SERIAL NUMBER)

USER TYPE: CUSTOMER ▽

SUBMIT SYSTEM INFORMATION

*Fig. 28*

IBM  5074 I/O EXPANSION
UNIT MODEL: 820

[EDIT]  [RETURN]

MACHINE TYPE: 9406  SERIAL NUMBER: 0012345
FRAME: 2  VPD DATE: 00/12/21

PCI CARDS
REAR VIEW - LEFT SIDE

| POSITION | POSITION DESCRIPTION | CCIN |
|---|---|---|
| C01 | IOP | 2843 |
| C02 | IOA | 2748 |
| C03 | IOP/IOA | 2838 |
| C04 | IOA | *2749* |
| C05 | IOP/INS | EMPTY |
| C06 | IOA | EMPTY |
| C07 | IOA | EMPTY |
| C08 | HSL - NOT A PCI POSITION | |
| C09 | IOP/IOA | EMPTY |
| C10 | IOA | EMPTY |
| C11 | IOP/INS | EMPTY |
| C12 | IOA | EMPTY |
| C13 | IOA | EMPTY |
| C14 | IOP/IOA | EMPTY |
| C15 | IOA | EMPTY |

REAR VIEW - RIGHT SIDE
PCI CARDS

*Fig. 35*

METHOD AND APPARATUS UPGRADE ASSISTANCE USING CRITICAL HISTORICAL PRODUCT INFORMATION

CROSS-REFERENCE TO RELATED APPLICATIONS

This application is a continuation of U.S. patent application Ser. No. 09/865,371, filed May 25, 2001 now U.S. Pat. No. 7,366,685, which is herein incorporated by reference in its entirety.

BACKGROUND OF THE INVENTION

1. Field of the Invention

The present invention generally relates to data collection and processing. More particularly, the invention relates to analysis of configuration and utilization data for the purpose of facilitating product upgrades.

2. Description of the Related Art

Users of information technology (IT) are becoming increasingly dependent on their systems in their everyday business and/or personal lives. As a result, users cannot afford to be "out of service" for any period of time, if at all. Users rely on system availability, good performance, capacity for near and long-term growth, and the capability to easily and quickly project total solution requirements for current and new third party applications. To meet these needs users must have the capability to procure new hardware and software in an expeditious manner. The demands of end-users have also created increasing challenges for salesperson professionals in providing the services needed to properly monitor, assess, size, recommend, configure and procure the solutions customers need.

Most end-users and salespeople do not have both the skill and time to understand and implement the steps necessary to address the above-mentioned challenges. Consequently, most end-users are operating their systems and counting on its reliability and serviceability in an environment of high risk. Specifically, end-users are not aware of what their actual utilization is and when they might meet unacceptable performance thresholds. Nor do end-users have sufficient knowledge to identify the cause of particular performance problems and what impact potential new applications will have on their systems. As such, users are at the mercy of third parties to advise them on assessing system utilization and sizing, configuring and procuring future solutions. Unfortunately, these third parties (e.g., sales professionals and technical support members) do not have the bandwidth to address all of the customers' needs.

Previous attempts to the foregoing problems include the use of tools, such as system monitoring tools, to provide end-users and sales professionals with meaningful information about system utilization. However, these attempted solutions have met with limited success due to problems ranging from ease-of-use to lack of integration. For example, system monitoring tools have been available for some time but the output has been difficult to understand and there is no integration with other tools/processes to determine what to do next. As a result, end-users of such tools are still dependent on outside "experts" to understand the information gathered and how to use it. Another tool which has been used unsuccessfully to address the issues of system maintenance and optimization is a configurator. In general, conventional configurators allows selection and configuration of features for a product in valid manner. Configurators proved too difficult in that they are not only inherently hard to use but they have not allowed for automatic integration of other data/facts derived from other tools.

Therefore, there exists a need for a solution that simplifies and expedites the process of managing and growing an information technology system, thereby helping to insure its success.

SUMMARY OF THE INVENTION

Embodiments of the present invention provide for an integrated business methodology that simplifies upgrade choices for complex computer products through the use of automation and integration of product monitoring and business applications with, for example, web based capabilities. Utilizing performance collection services of a computer system product, system information is collected and then transmitted to a remote support system. There the system information can be processed and formatted to provide historical data for the product. By utilizing historical data collected from the computer system over time, the choice of product enhancements, new workloads, upgrades and customization can be simplified through the use of the collected information which reflects how the product is used and where growth needs might be most needed. Further, this historical view may be integrated with the advances in the product that are kept by the remote support system. The upgrade process is simplified through automated data collection, accurate usage information, combination of such information with advancements in the product and the ability to order directly from product upgrade facilities, e.g., on the Web. This process further facilitates a total solution by permitting third party application providers to add performance requirements for their applications to the overall system needs.

One embodiment provides a method of operating a computerized system to provide computer recommendation information for a plurality of computers. The method comprises generating an operation profile for a computer using machine information specific to the computer, wherein the operation profile indicates at least a usage trend for the computer; and generating a recommendation for at least one computer system solution which satisfies at least the usage trend.

Another method of operating a computerized system to provide computer recommendation information for a plurality of computers comprises receiving machine information for the plurality of computers; storing the machine information to a history database and generating an operation profile for a computer using machine information specific to the computer, wherein the operation profile indicates at least a history profile and a usage trend for the computer. System requirements specifications reflecting workload requirements for the computer not accounted for in the machine information are then received and a recommendation for at least one computer system solution which satisfies a desired usage of the computer is generated.

Still another embodiment provides a system for generating recommendation information for computer devices. The system comprises a machine information collection system configured to receive machine information for a plurality of computers; a history database containing statistical information generated using the machine information; and a system sizer. The system sizer is any machine or combination of machines configured produce system recommendations using at least the statistical information.

Yet another embodiment provides a system for generating recommendation information for computer devices. The system comprises a network connection to a network of computers; and a system sizer configured produce system recommendations using at least one of statistical information for a plurality of computers, user input information and third-party solutions.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 16 is a graphical user interface illustrating a workload definition page.

FIG. 19 is a graphical user interface illustrating a comparison page.

FIG. 20 is a graphical user interface illustrating a comparison page.

FIG. 22 is a graphical user interface illustrating an order entry screen.

FIG. 26A is an exemplary interface file input to a configuration server.

FIG. 26B is an exemplary interface file output from a configuration server.

FIG. 27 is an illustrative graphical user interface configured for input of a machine type, plant code and serial number.

FIG. 28 is an illustrative graphical user interface configured for input of a base system.

FIG. 35 is an illustrative graphical user interface configured for displaying results of a placement query.

DETAILED DESCRIPTION OF THE PREFERRED EMBODIMENTS

System Sizing and Configuration

Embodiments of the present invention provide for an integrated methodology simplifying the upgrade choices for complex computer products through the use of automation and integration of product monitoring and business applications. In general, a method comprises data collection and summarization, transmission, workload estimation, solution generation, configuration and product ordering. In one embodiment, methods and systems provided herein are configured with Web-based capabilities. However, any networked environment and interface format may be used to advantage.

Figure 1:
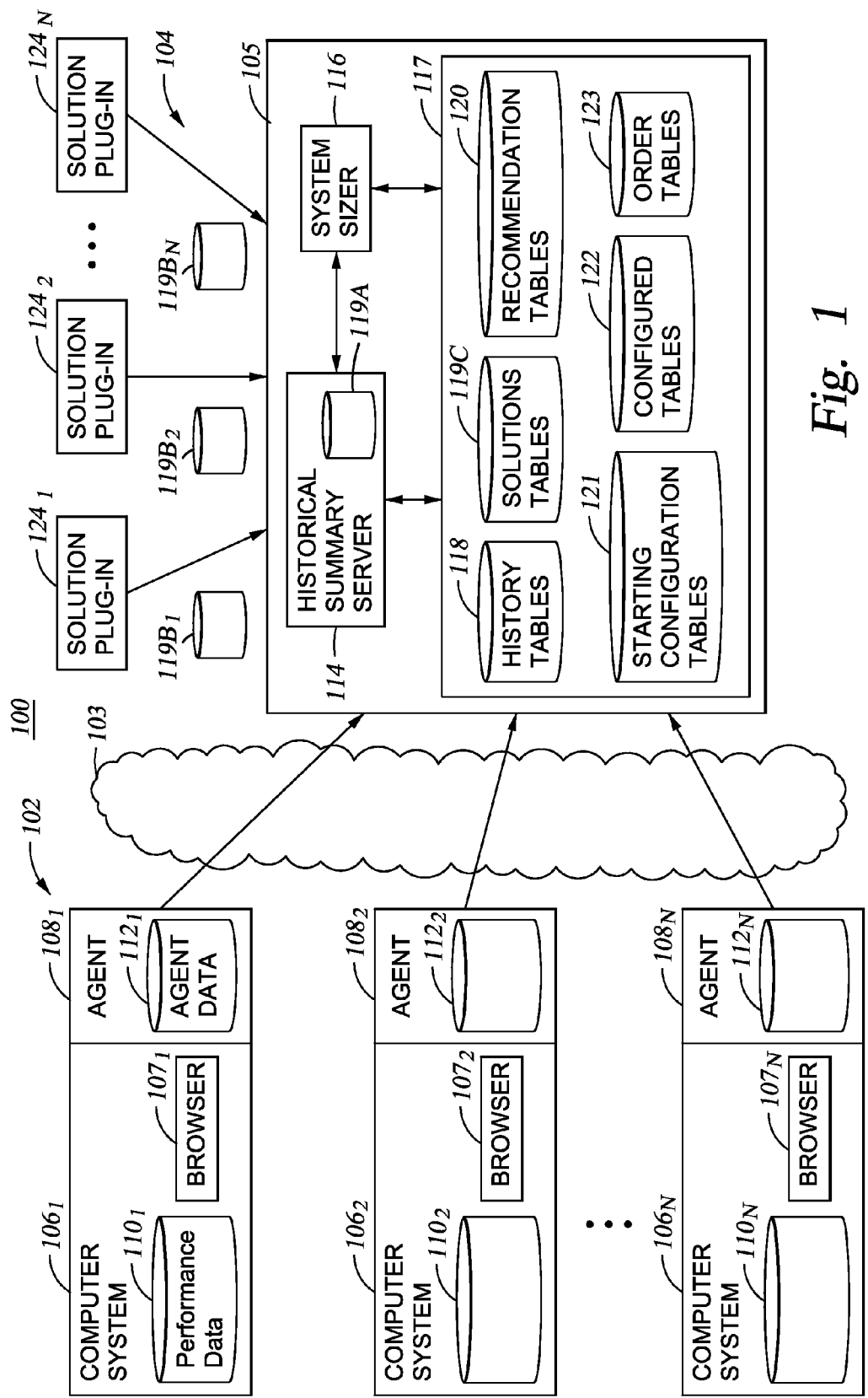
FIG. 1 is a high-level diagram of a networked environment.

FIG. 1 is a diagram of a networked environment 100 generally defining a relationship between a computer system customers/owners side 102 and a computer system supplier side 104 (the "supplier 104"). The customers/owners side 102 may include any person, group of persons or enterprise who individually or collectively operate one or more computer systems $106_1, 106_2 \ldots 106_N$. The computer systems may be any computerized device including personal computers (PCs), workstations, servers, wireless devices, personal digital assistants (PDAs), and the like. Each computer system 106 includes a performance database $110_1, 110_2 \ldots 110_N$ containing performance data about various system resources, threads of execution, configuration information, etc., for the computer system 106. Each computer system 106 further comprises an data collector agent $108_1, 108_2 \ldots 108_N$ (referred to as the "agent 108"). The agent 108 may be any combination of software and hardware configured to automate collection and summarization of the performance data. One commercially available agent is the PM/400 agent available from International Business Machines, Inc. The resulting agent data is stored in an agent database $112_1, 112_2 \ldots 112_N$ and is periodically exported to the supplier 104. Subsequently, the computer system 106 may execute a client program 107 (e.g., a web browser) to access the data managed by the supplier 104.

The supplier 104 is any entity or organization capable receiving, processing and maintaining agent data from a plurality of customer computer systems 106 in order to facilitate product and system upgrades/enhancements. The supplier 104 operates a supplier system 105 configured to establish a network connection with one or more of the customer computer systems 106 via a network 103. In one embodiment, the network 103 is the Internet. In another embodiment is a network private connection/network between the customer system 102 and the supplier system 105. Illustratively, the supplier system 105 comprises a historical summary server 114 and a system sizer 116. The historical summary server 114 and/or the system sizer 116 are each in communication with a plurality of databases 117. The databases 117 include a history tables database 118, a solutions table database 119C, a recommendation tables database 120, a starting configuration tables database 121, a configured system database 122 and an order tables database 123. In one embodiment, the system sizer 116 is configured with or configurable with one or more solution plug-ins 124, which include capacity planners 125 (shown in FIG. 2).

As shown in FIG. 1, the supplier system 105 includes a plurality of solution tables databases 119A-C. The solution tables databases 119A-C (collectively referred to as solution tables database 119) indicate that solution tables may be generated/provided by various means and sources. A first solution tables database 119B is shown associated with the historical summary server and represents solution tables generated using the information contained in the history tables database 118. A second solution tables database 119B is shown associated with the solution plug-ins 124 and represents solution tables for third-party system solutions. A third solution tables database 119C represents any other sources of solution tables including, for example, solution tables generated in response to user supplied information while interacting with the supplier system 105 (e.g., while interacting with a web page hosted by the supplier system 105). The user-supplied information may be provided in response to pre-defined questions presented by the supplier system 105 to a user or by modifications made by the user to information provided by the supplier system 105.

The operation of the networked environment 100 may be described with reference to FIG. 2. The overall operation is indicated by a series of circled numerals, wherein each numeral represents one or more processing steps. Any and all stages of the illustrated business process may be performed iteratively, thus enabling a user (e.g., the customers 102, the supplier 104, and business partners) to address a total solution.

Figure 2:
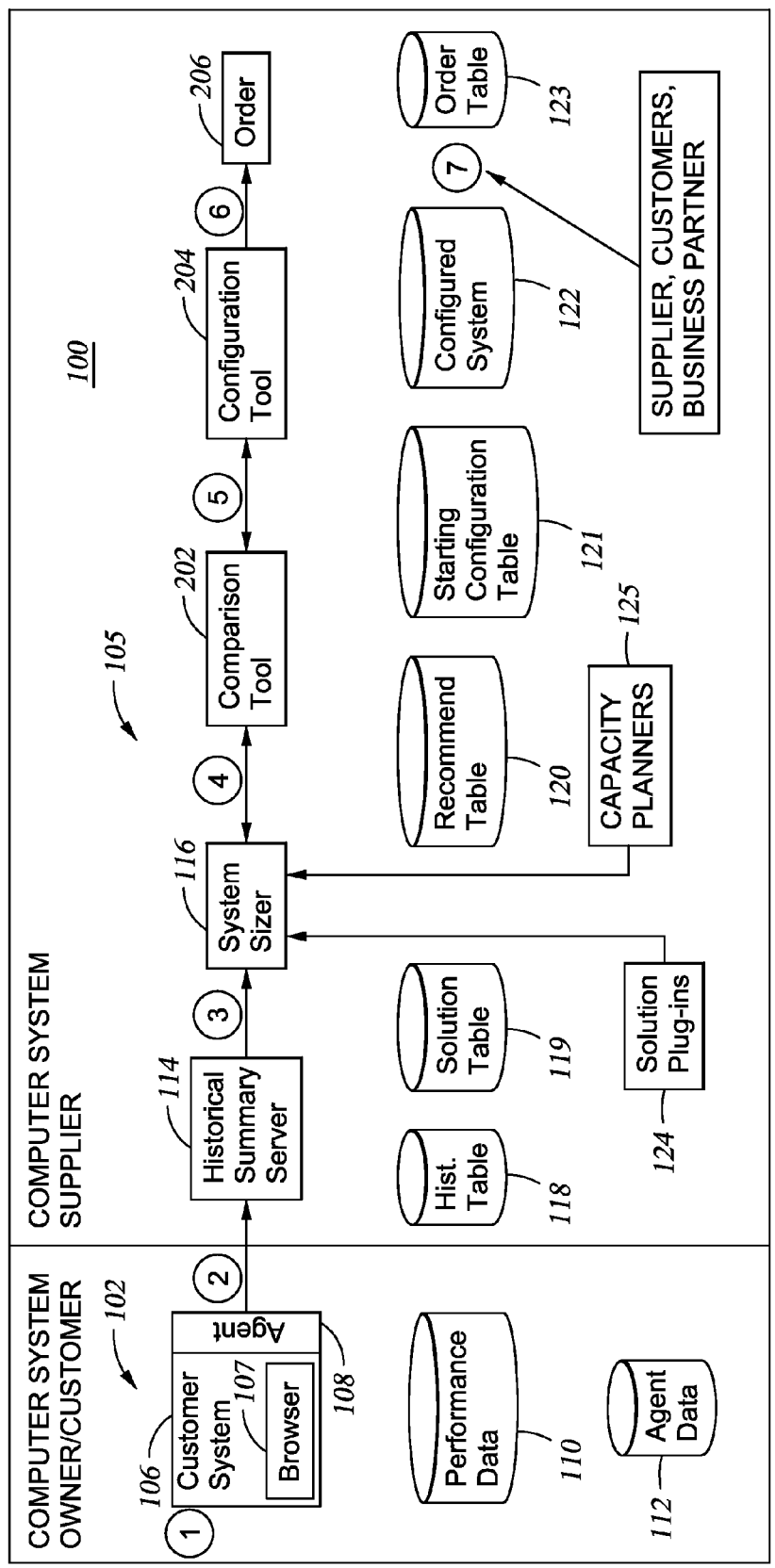
FIG. 2 is a system diagram of an environment having a owner/customer side and a supplier side.

For purposes of illustration, only one customer/owner computer system 106 is shown in FIG. 2. However, it is understood that the supplier system 105 will typically communicate with a plurality of computer systems 106 (as shown in FIG. 1). It should also be understood that the computer 106 making a request for upgrade information may or may not be the same computer that initially provided the relevant agent data. It is further understood that while FIG. 2 shows only one solution table 119, a plurality of solution tables may be provided.

Initially, raw performance data from the computer system 106 is collected and stored in the performance data database 110. Performance data collection may be facilitated by a product and/or system specific function such as the O/S 400 Collection Services available from International Business Machines Inc. The performance data is then summarized and exported to the supplier system 105. The summarized and exported data is referred to as agent data and is contained in the agent data database 112.

Summarization and exportation need not occur on the same cycle. For example, performance data may be collected daily while agent data may be exported daily, weekly or monthly. In one embodiment, the agent process on a customer system 106 is activated to automate the process of summarizing raw performance data for 24 hour time period. The summarized agent data is processed to determine averages, peaks, minimums, and maximums by job, job type, workloads, user, and total system for that time period (i.e., the 24 hour time period). The granularity of data is determined according to the age of the data, with granularity decreasing with age. This occurs because over time the data is processed and condensed.

Upon receipt by the supplier system 105, the agent data is stored to a historical tables database 118, which is under the control of the historical summary server 114. In one embodiment, the historical summary server 114 maintains twenty-four months worth of historical data for the plurality of computer systems 106 in the historical tables database 118. At some timed interval (e.g., monthly) the historical summary server 114 operates to merge the summarized agent data with older history data (previously collected from the same computer system 106) in the historical tables database 118. Data in the centralized data repository (History data) is processed by some timed interval (monthly) creating a daily, weekly, and/or monthly profile to show statistically and graphically what happens week to week and month to month etc. In particular, the historical data is analyzed to determine growth rates, consumption rates, monthly averages, seasonal peaks, growth parameters, and trends using the data provide by the customer systems 106. In this manner, the supplier 105 is provided with important summarized statistics for later use.

Summarized performance data contained in the historical tables database 118 is then fed into a system sizer 116. The role of the system sizer 116 is to analyze the data and determine system resource requirements currently needed (current system needs) and those resources that might be needed at a future time (projected system needs). One system sizer that may be used to advantage is the IBM Workload Estimator for iSeries available from International Business Machines, Inc. Illustrative system resources that may be accounted for by the system sizer 116 include the system CPU, the system memory, the hard disk, etc.

In one embodiment, the system sizer 116 defaults the performance requirements to current system usage. The end user of the system/component has numerous options to then tailor and customize the projection. The user selects from the amount of CPU, interactive capacity, DASD, memory, etc., to control the growth projections that best reflect the system's use. The user can also select periods most representative of the system's typical work load by removing those that do not apply. The user can then modify the intended use of the system based on new programs/applications and solutions such as Domino serving, server consolidation, or Websphere serving, for example. The user may iterate through this step of the process, trying out variations ("What-ifs") for workloads to include, workload definition details, assumptions, and growth options before proceeding to the next step.

In one embodiment, the system sizer 116 provides for tying in the capabilities of capacity planners 125 and solution plug-ins 124. Such an arrangement may be particularly beneficial where the system sizer 116 is intended to be a quick and easy-to-use component with accuracy sufficient for marketing purposes. Where much greater accuracy and precision is desired, the system sizer 116 could communicate with a capacity planner 125 (by the supplier 105 or a 3rd party). As is well-known, capacity planners employ elaborate and detailed system models to project with great accuracy and precision. An exemplary capacity planner which may be used to advantage is Best/1 available from BMC Software, Inc.

Additionally or alternatively, solution providers can define plug-ins 124 to the system sizer 116. This provides a means to externally describe the impacts of the solution on the system resources and have them considered as part of the overall affect of the total needs of a user. For example, system sizer 116 may utilize impact descriptions provided by third-party solutions such Domino and Websphere. To this end, the system sizer 116 supports the plug-in screen displays, parameter inputs, and solution-specific system resource requirements inclusion into the total system resource requirements.

The final output of the system sizer 116 is a recommendation table which is stored to the recommendation table database 120. The recommendation table provides a single resource impact view across one or more solutions by compiling the input from various solution suppliers and the base computer system 106.

The system sizer 116 employs a system model selection function, referred to as the comparison tool 202, to construct the set of all systems capable of meeting the system capacity requirements. In one embodiment, the comparison tool 202 is the AS/400 FACT, available from International Business Machines, Inc. The solution set can be limited depending on specific user needs. Available user-selectable controls include (but are not limited to) orderable upgrade to existing system or new system, specific system model types (e.g., low ends, servers dedicated to specific workloads, latest models being sold), excess capacity for future needs, etc. To construct a solution set, the comparison tool 202 uses the recommendation table generated by the system sizer 116 as input, provides the user with additional modification options (according to an available product line) and produces a starting systems configuration table. This resulting table is stored to the starting configuration tables database 121.

Invoking a configuration tool 204, the supplier system 105 then automatically configures specific system feature codes based on recommended system solutions. The configuration can be further tailored and expanded to include hardware/software components not identified in the system sizing (e.g., tape drives, network adapters, licensed software products, etc.). Taking the starting system configuration table (generated by the comparison tool 202) as input the configure process allow for the addition of other resources and produces a final orderable system configuration based on the total solution view determined earlier.

The complete system configuration (new or upgrade) feature code list is then passed to a system order placement function 206 (also referred to herein as the "order function 206"). The order function 206 is configured to format an order table which is then stored to the order table database 123. A supplier representative, business partner representative, or end user can inquire about schedules and status of orders placed by inspecting (e.g., via a Web interface or some other user interface) the order table.

The foregoing process provides value at any given stage and the value of the process compounds as more stages are included. Accordingly, the process does not require completion in a continuous effort. To the contrary, the process is flexible and allows for exiting at the different stages and later re-entry to continue the process. To achieve this result, a user's state of progression is preserved and passed between each of the different layers. For example, the data that enables the comparison tool 202 is the same data needed for the configurator definition processes.

In addition, the foregoing process is sensitive to the different levels of expertise of users utilizing the supplier system 105. To improve the productivity of all groups, the embodiments of the present invention provide each individual the ability to enter the process at their own comfort level. By driving as much of the process through realtime data directly from the supplier system 105, and solution tables from solution suppliers 124 the overall expertise required by the user is reduced.

The system 105 and its related operation are merely illustrative. In another embodiment, the supplier system 105 may be operated by an independent party, thereby facilitating communication between end-users, the supplier 102, business partners and others. In such an environment, the system 105 may be understood to operate as a broker. Further, any one or combination of the components of the supplier system 105 may be remotely located and operated (e.g., by an application service provider (ASP)). For example, any or all of the databases described above may be located at a remote storage facility. In another embodiment, the overall process implementation may be hosted by servers of the supplier 102 but executed on behalf of business partners of the supplier 102. In this way, a user could enter the process from a business partner web site and the output would flow back to the user from the business partner web site. Persons skilled in the art will recognize other embodiment within the scope of the present intention.

Regardless of the particular arrangement, the environments described with reference to FIGS. 1-2 are particularly well suited as Web implementations. Providing the supplier historical information database, system sizing, capacity planning, solution plug-ins, system model selection, configuration, system ordering, and order status inquiry off the web allows easy user access for recommendations unique to the user based on the information provided. Web deployment also allows for easier and more expedient process or component modifications should additional conditions be discovered in the field that could not have been covered in the testing phase of the product. Thus, the present embodiments allow for dynamic modification of the recommendations based on real usage to enhance those originally determined from product test phases.

FIGS. 3-11 show embodiments of data flows emphasizing the nature of the data used and the manner in which it is generated and processed. As will be clear from the nomenclature, each of the data structures referred to below has a corresponding database shown in FIGS. 1 and 2. Illustratively, the data is stored in tables. The tables may be arranged as a plurality of columns and rows, wherein each row is a record.

Figure 3:
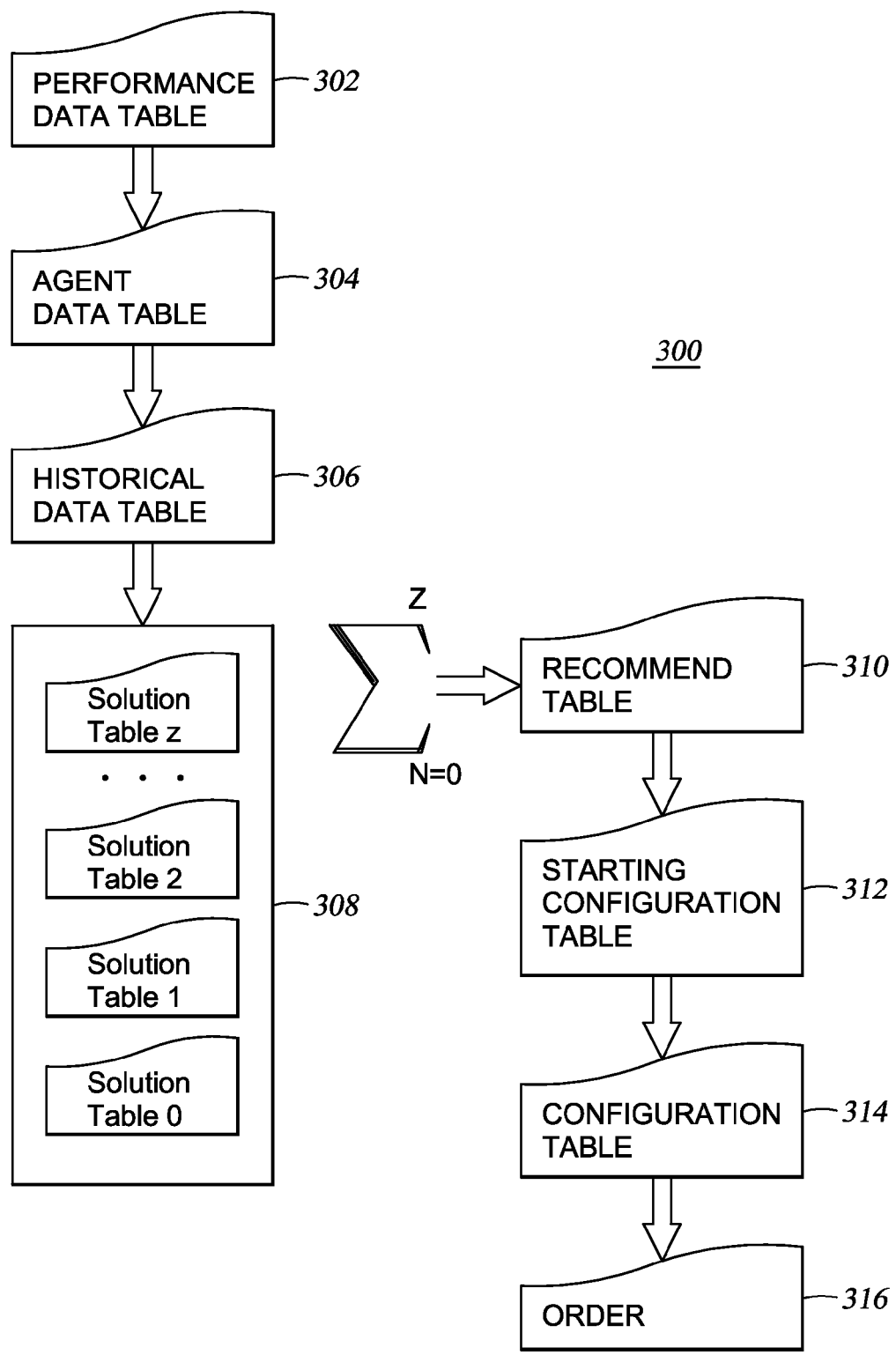
FIG. 3 is an overall dataflow for combining workload requirements in generating an order.

Referring first to FIG. 3, an overall data flow 300 is shown. The data flow 300 includes a collected performance data table 302, a product based summarization data table 304 (i.e., the agent data), and a historical data table 306 (a historical rollup of the product based summarization data table 304). Used in parallel, these data facilitate the automation and dynamic collection of solution tables 308. This can be done on a solution basis, a product basis or set of products basis. Other solution tables can be generated from asking the user a series of questions such as usage questions, workload descriptions, and workload consumption to generate the solution table for non-automated data collection.

The system sizer 116 then consolidates these solution tables 308 and produces a single workload estimation table, i.e., a recommendation table 310. The recommendation table 310 outlines the recommendations based on the integration of the multiple solution tables 308 being consolidated into a single workload. Subsequently, a starting configuration data table 312 (contained in the starting configuration table database 121) is used to help select the best fit for a particular workload mix and a configuration and price are determined from a configuration table 314 (contained in the configured system database 122). The result may then be displayed to a user for approval. After the user has seen and approved a configuration, the order can be placed and is represented here in the order file 316 (which may then be stored to the order table database 123).

Figure 4:
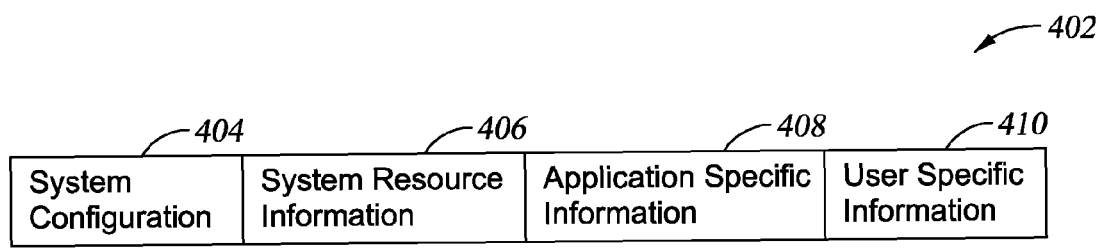
FIG. 4 is a performance collection data structure.

FIG. 4 shows a record 402 from a performance data table 302 created by a performance collection function. Performance collection and monitoring is well known. Typically, performance collection is a function that is part of the base operating system of a computer system 106, but it may be software that is separately installed. Performance monitoring is a function that monitors the low level hardware and software instrumentation and surfaces the data in a meaningful form. It does this, for example, by sampling different system counters at regular time intervals. Performance monitoring translates the counter values over time into values that can be used to manage the performance of a system. However, the particular method of collection and monitoring is not limiting of the present invention.

The record 402 is an illustrative representation of this collected performance data and is made up of several key data entries. In the illustrated embodiment, these entries comprise a System Configuration entry 404, a System Resource Information entry 406, an Application Specific Information entry 408 and a User Specific Information entry 410. System configuration is a detailed accounting of the components of the system and may also include such pertinent information as the location (rack and slot) of the components. System resource information includes utilizations, totals, averages and peaks for different measurements depending on the component being measured. Resource information consists of resource types and their usage. Examples of resource information include processor utilization, memory utilization, disk arm utilization, disk space used. Application Specific Information describes run time consumptions for applications themselves. Examples of application specific information include total time an application took to complete, system resources used while the application was running, and units of work completed. User Specific Information includes the performance aspects as represented to the user. Examples of user specific information include response time information, units of work completed in a given amount of time, and system resources used by each unit of work.

Figure 5:
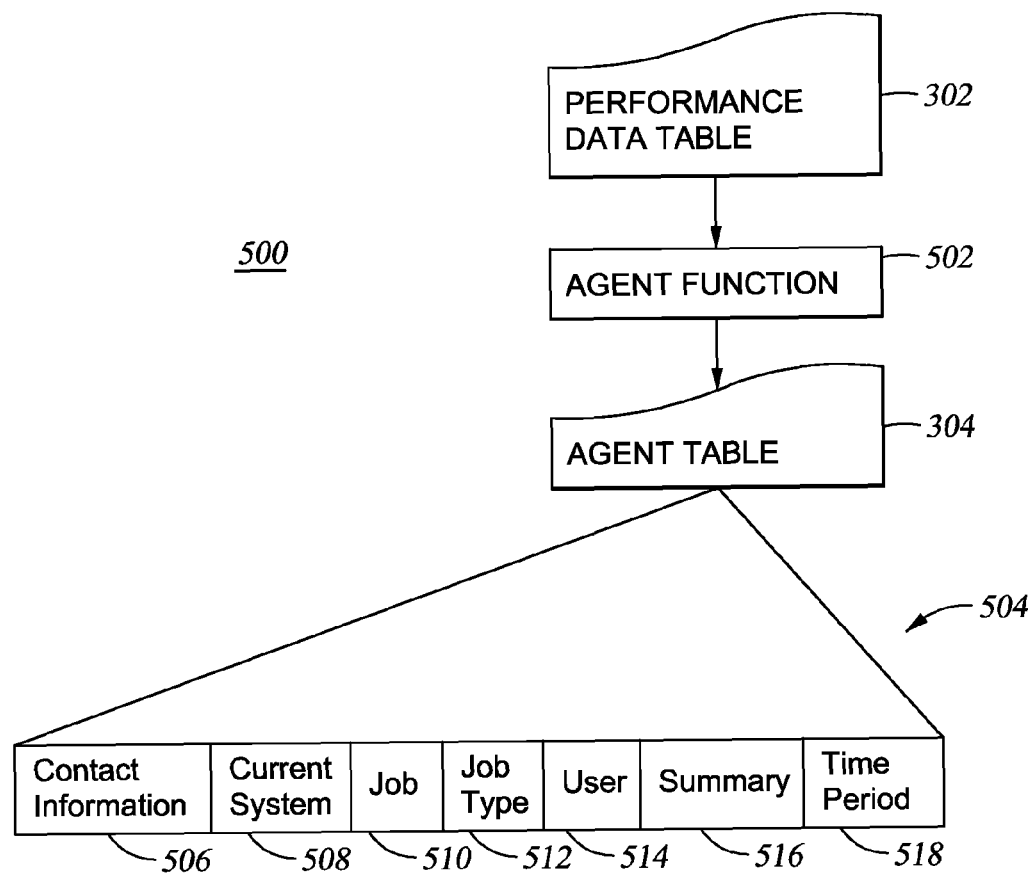
FIG. 5 is a illustrative agent function flow.

FIG. 5 shows a method 500 illustrating the operation of an agent function 502 (invoked by the agent 108) with regard to the performance data table 302 and the agent data table 304. The agent function 502 summarizes, or otherwise processes, the performance data table 302 and its data content. The agent function 502 also automates the actual collection of the data. This process includes automating the gathering of the performance data, compressing the raw collected performance data into summarized data which is managed and archived by the agent 108 and later exported by an automated means (such as a job scheduler) into the historical table 306.

FIG. 5 also shows one embodiment of a record 504 contained in the agent table 304. The agent table comprises a contact information entry 506, current system entry 508, a job entry 510, a job type entry 512, a user entry 514, a summary entry 516 and a time period entry 518. Examples of contact information include name, address, telephone number. The current system attributes contain elements such as CPU, memory and storage space sizes or capacities, configuration definitions such as mirrored DASD, partitions used, etc. Job information 510 is statistics relating to a specific job such as response time, wait time, processing time. Job type information 512 is statistics on a type of job or task such as interactive, batch, or system. User data relates to a specific user identifier. Summary information is data summarized for a period of time such as a first shift or a second shift. The time period includes the number of samples taken by the agent function 502 and the sample period or timeframe (e.g., 5 or 15 minute intervals).

Figure 6:
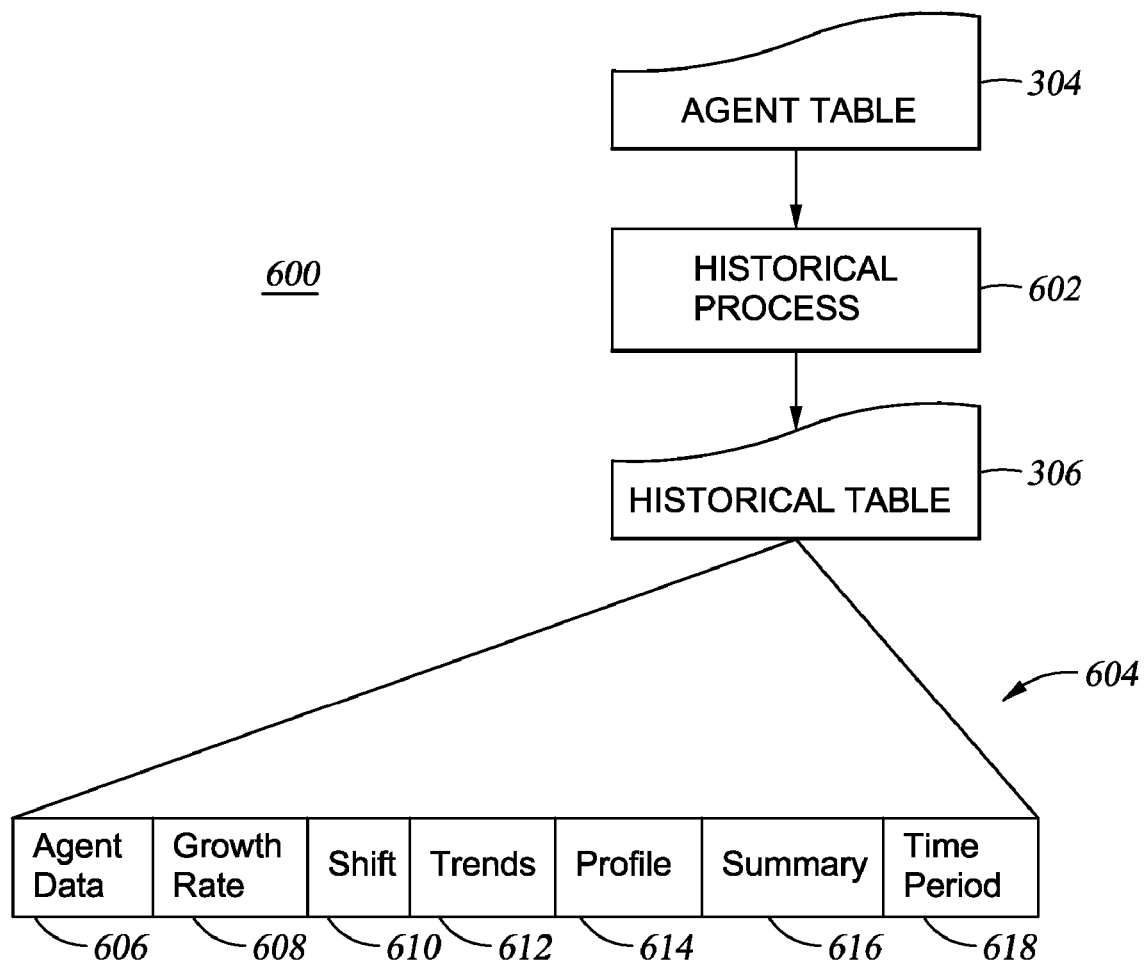
FIG. 6 is an illustrative method for compiling and summarizing historical data.

FIG. 6 shows a method 600 illustrating the operation of a historical process 602 with respect to the agent table 304 and the historical table 306. The historical process 602 compiles or summarizes larger amounts of alert data into monthly cells of information. Each computer system 106 has a history of its operation over the past, for example, 13 months (or less if monitoring has not been active for 13 months or more). After importing the agent data for the collection period, the sample is archived in the historical table 306 and calculations are made to calculate daily, weekly, monthly statistics. In addition, the job and job types are derived, and the workload and user supplied trends for growth, monthly and daily operations are added to the historical table 306.

An illustrative record 604 of the historical table 306 is shown in FIG. 6. The record 604 comprises an agent data entry 606, a growth rate entry 608, a shift entry 610, a processor trends entry 612, a profile entry 614, a summary entry 616 and a time period entry 618. The agent data 606 entry may contain contact information, current system attributes, job information, job type, workload, and sample interval. The growth rate entry 608 contains calculated utilization for a particular resource. The shift is defined by a user and indicates when the information was collected and for which IT operational shift. The trends entry 612 contains calculated projections for system resources (such as CPU, disk, interactive feature card) based on current growth. The profile entry 614 contains averages across different collected metrics to delineate the differences between what a typical day or month looks like. The summary entry 616 contains the summation of calculated averages for different collected resources and metrics.

As described above, the solution tables 308 may be created automatically (i.e., through the use of automatic performance data collection and system sizing) or manually. In either case, information from third party solutions providers and capacity planners may be used. Further, the automatic and manual methods may be used in tandem. Such an approach is illustrated in FIG. 7.

Figure 7:
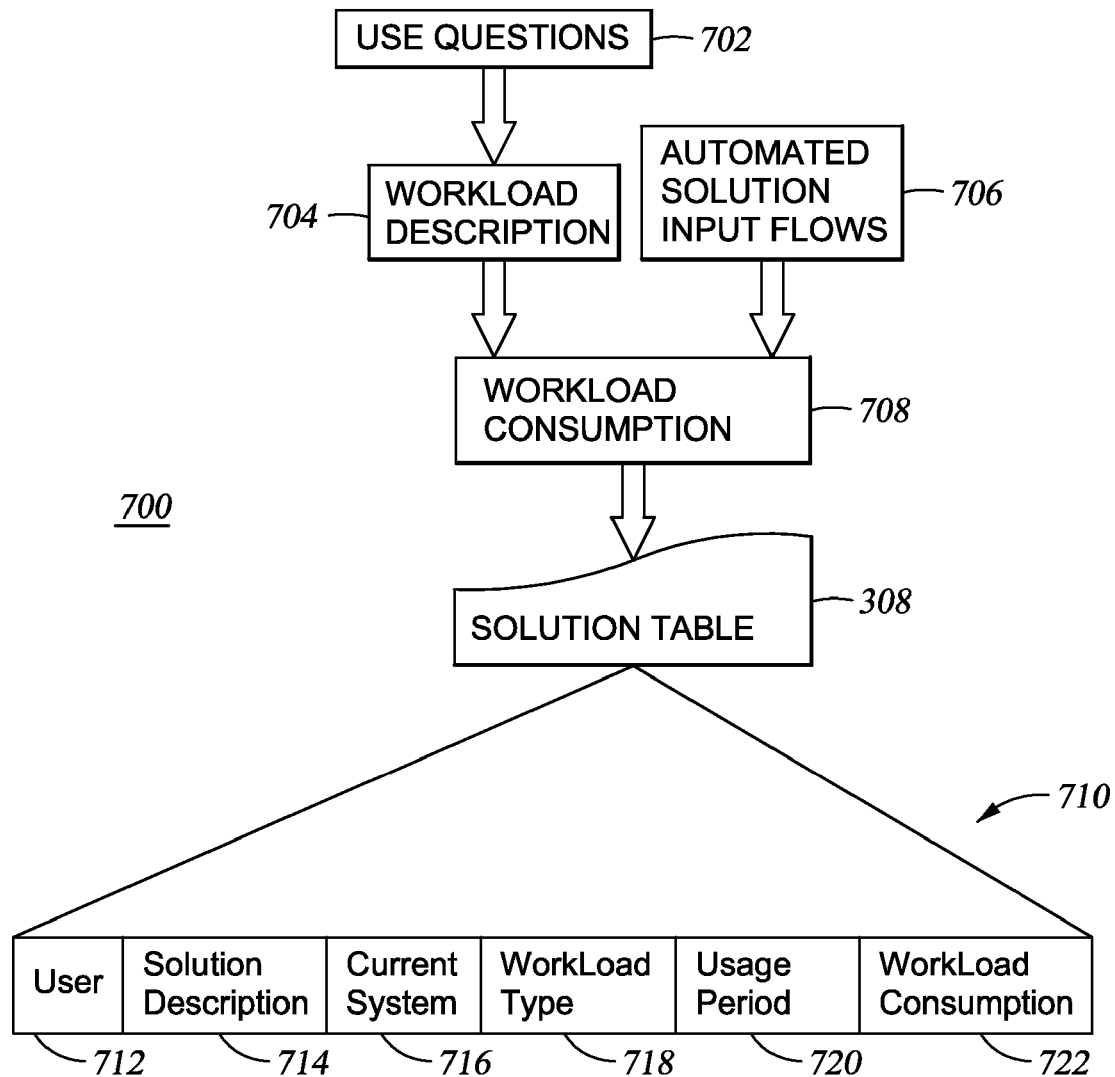
FIG. 7 is an illustrative solution input flow defining how third party solutions or capacity planners can input their workflow impact into a defined process.

FIG. 7 shows a solution input flow 700 defining how third party solutions or capacity planners can input their workload impact into a defined process in a more manual fashion while also allowing for automated solution input flows. In general, the solution in the flow 700 includes first asking a series of use questions 702 and secondly asking particular questions regarding the workload description 704 itself. In addition, automated solution input flow 706 are provided. Both methods (i.e., automatic and manual) require a defined workload consumption 708 to be assigned in order to derive a solution table 308. By allowing both methods as input through a common solution table definition the system sizer 116 can apply workload impacts from many different vendor sources to compile an overall system impact in an integrated fashion.

FIG. 7 also shows one embodiment of a record 710 contained in the solution table 308. The record 710 is made up of several key data elements including a user entry 712, a solutions description entry 714, a current system attributes entry 716, a workload type entry 718, a usage period entry 720, and a workload consumption entry 722. Examples of a user include a customer, a business partner selling the product, or employees of the solution provider themselves. The solutions description identifies the solution as a particular solution such as Lotus Notes, WebSphere, JDE OneWorld, etc. The current system attributes contain elements such as CPU, memory and storage space sizes or capacities, configuration definitions such as mirrored DASD, partitions used etc. The workload type is defined by the supplying vendor and examples include traditional, Lotus Notes, Java or other program execution models which bring differing workload demands to the computer system 106. The usage period includes the number of data intervals and the data interval period or time frame, such as 1 months worth of data or 1 day or 1 week. The workload consumption is the actual use of the measured data on system resources like CPU, DASD and memory.

Figure 8:
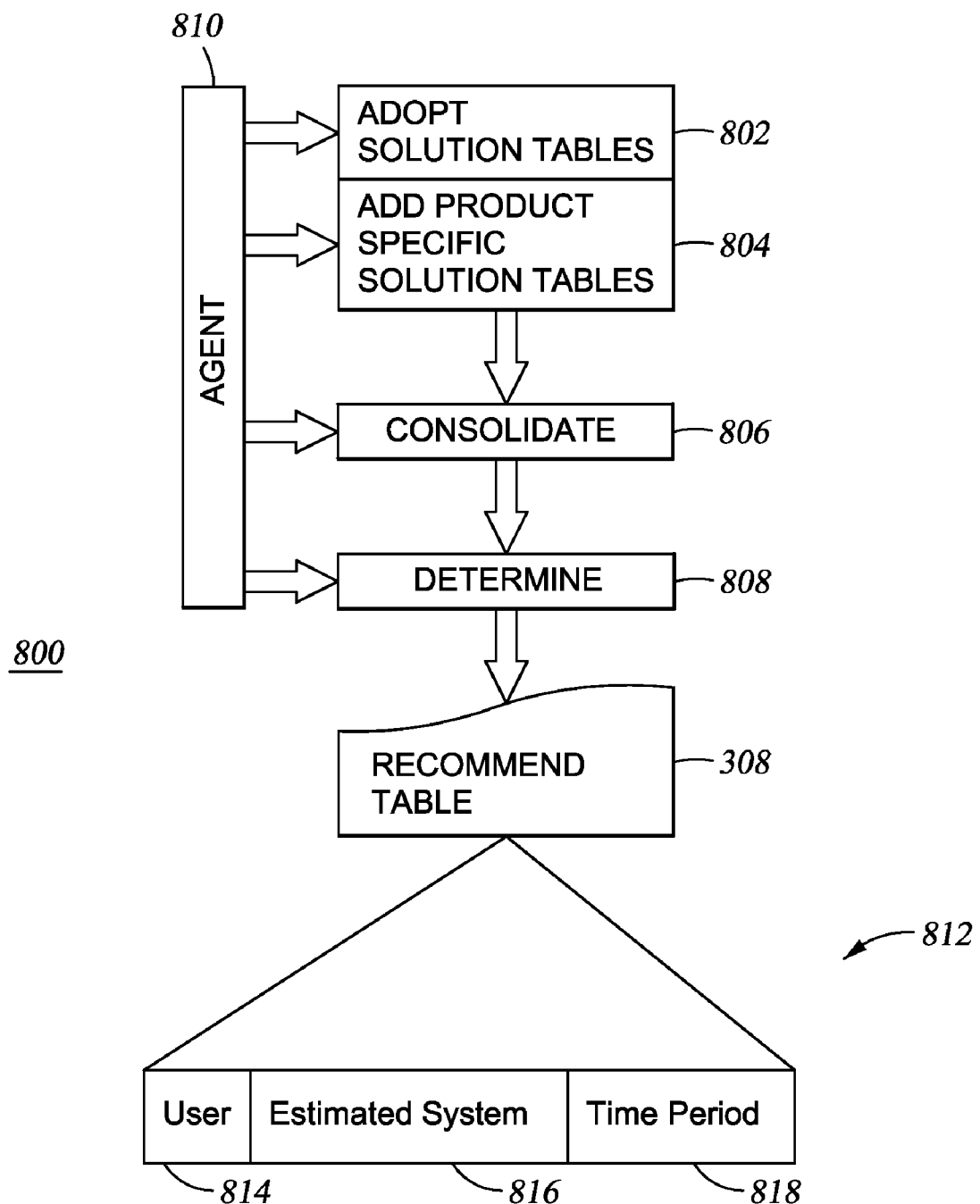
FIG. 8 is an illustrative system sizer process.

FIG. 8 shows an embodiment of a system sizer process 800. The system sizer process 800 defines how the system sizer 116 processes inputs (e.g., solution tables) and generates the recommendation table 310. As described above, solution tables can be generated from third party solutions or capacity planners and adopted at step 802. In addition to accepting solution tables as input, the system sizer 116 may add product specific solution tables 308 supported within the sizer 116 itself, as represented at step 804. In one embodiment, product specific solution tables supported by system sizer 116 include Domino Mail, HTTP Websphere, etc. At step 806, the system sizer 116 consolidates the workload consumption requirements from all the solution tables 308. The recommend table 310 is a result of determining, at step 808, the systems acceptable to support the consolidated requirements. Throughout the process 800 the user is provided the ability to adjust (block 810) the inputs, consolidation, and determinations made by the sizer 116.

The recommendation table 310 is a result of the system sizer process 310. It represents one or more systems with resources capable of handling the requirements. FIG. 8 shows one embodiment of a record 812 contained in the recommendation table 310. Illustratively, the record 812 comprises several key data elements including a user entry 814, an estimated system attributes entry 816, and a time period entry 818. Examples of a user include a customer, a business partner selling the product, or employees of the solution provider themselves. The estimated system attributes contain elements such as system model, CPU, memory and storage space sizes or capacities, configuration definitions such as mirrored DASD, partitions used etc., and descriptive or cautionary comments that may apply to the specific system. The time period indicates whether the estimated system meets the current requirements or for a future point in time (e.g., 12 months) as selected by the system sizer user.

Figure 9:
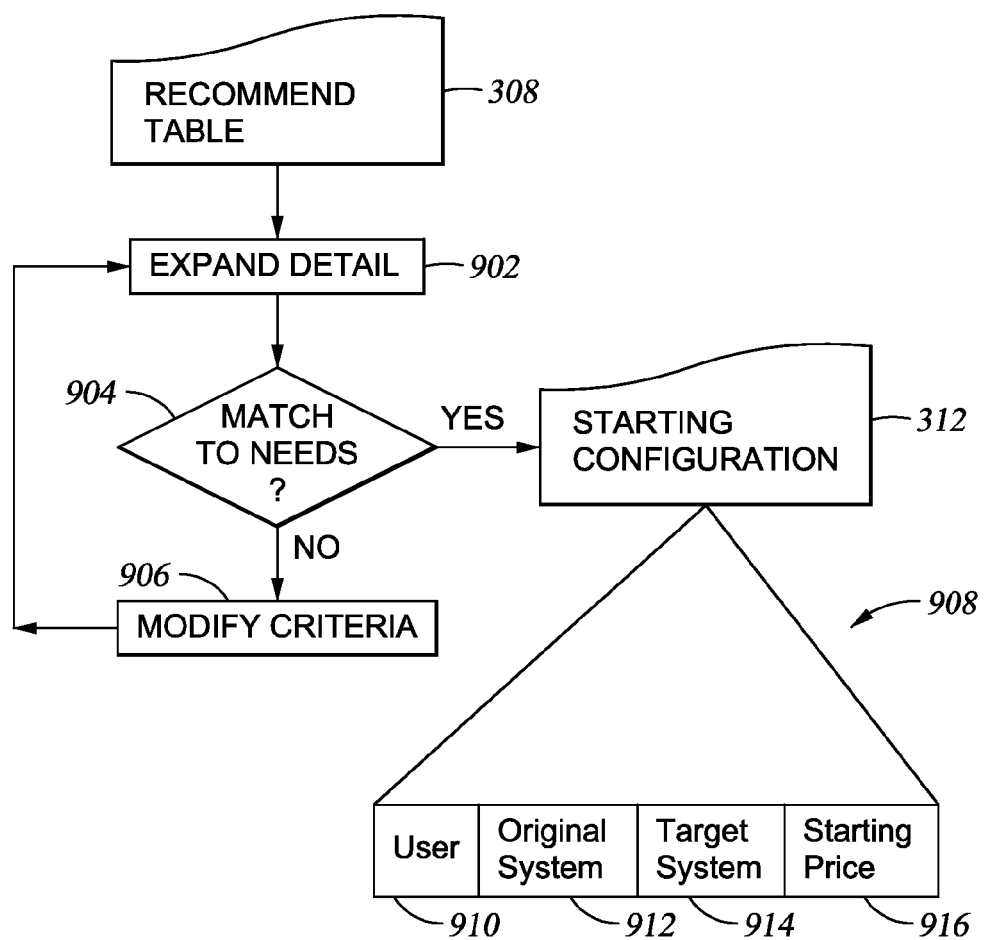
FIG. 9 is an illustrative comparison process for comparing different product capabilities and prices.

FIG. 9 illustrates one embodiment of a comparison process 900 implemented by the comparison tool 202. The comparison process 900 defines the way the comparison tool 202 facilitates the comparison of different product capabilities and starting prices to help a user determine the product that best fits their needs and budget. In addition to accepting recommendation tables 310 as input, the comparison tool 202 may be initiated with any arbitrary list of products or criteria. By modifying the criteria used to display systems, the user may expand (step 902) the amount of information to analyze or focus on specific pieces of information. The user may choose to focus on the recommended criteria or expand to additional information the recommend table 310 did not take into account. At step 904, a user may decide whether the recommendations match their needs. If not, the criteria may be modified at step 906. Once a particular product is selected, the starting configuration table 312 can be built. The starting configuration is a specific starting point and "ballpark" price from which to begin configuring a system. Some examples of product capabilities to compare include data used by system sizer 116 such as processor speed, maximum memory, maximum disk, etc., as well as expanded details such as maximum LAN lines, maximum workstations, maximum I/O processors, maximum expansion racks, etc.

FIG. 9 shows one embodiment of a record 908 contained in the starting configuration table 312. The record 908 is made up of several key data elements including a user entry 910, an original system entry 912, a target system entry 914, and a starting price entry 916. The user is the same user as in other process steps to ensure continuity throughout. The original system is the detailed list of parts in the user's existing machine in the case of an upgrade. The target system is the system the user has determined best fits their needs. If original system is blank, target system reflects an entirely new machine. If the original system is supplied, an upgrade scenario is assumed. The starting price is a planning and budgeting value that sets the expectation for what the ultimate price will be. Both the original system and target system are communicated in the form of model numbers, part numbers, features, etc, that are used both for billing and/or manufacturing purposes.

Figure 10:
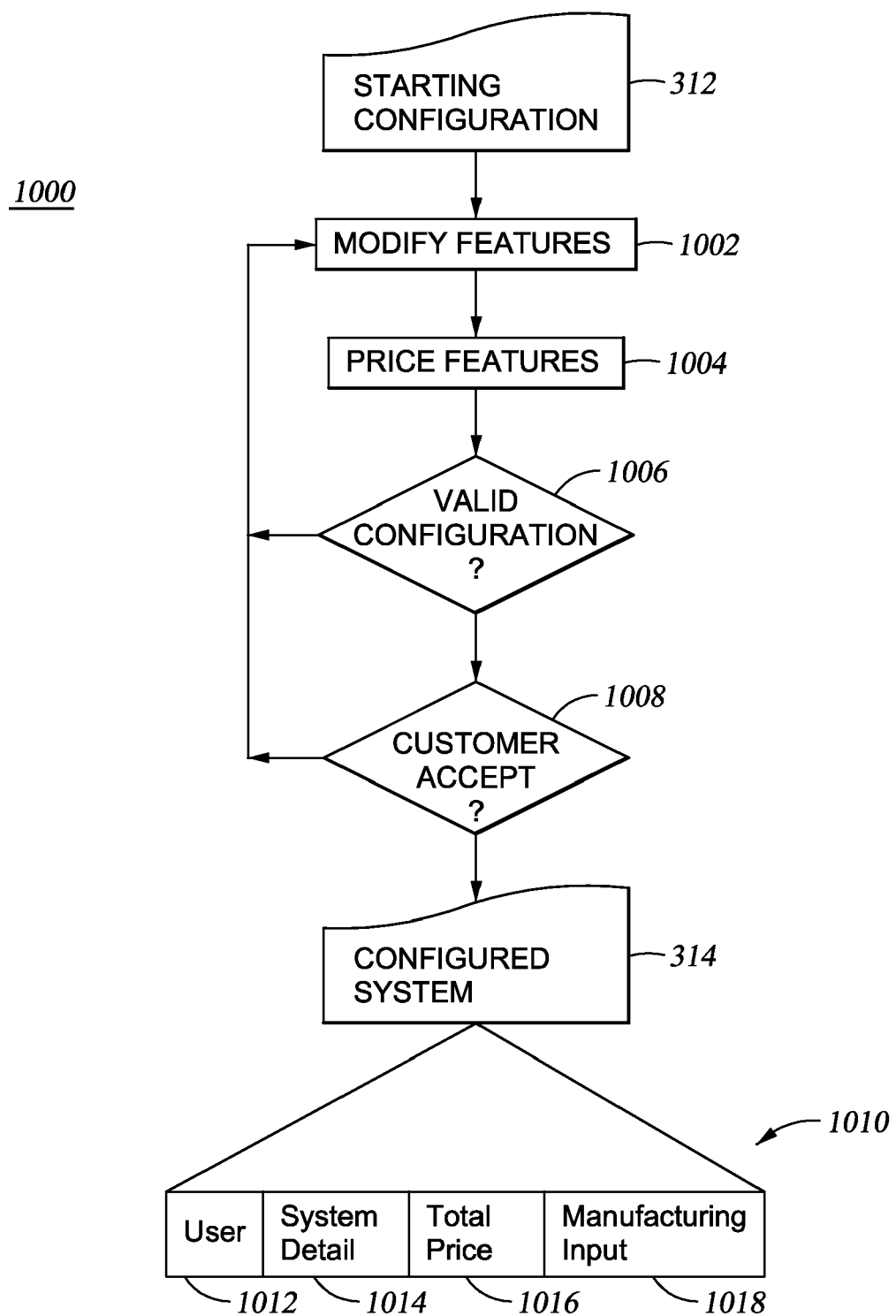
FIG. 10 is an illustrative configuration process for determining a valid system.

FIG. 10 shows a configuration tool process 1000 implemented by the configuration tool 204. The process 1000 defines the steps for determining a valid system that can be manufactured and priced. Using the starting configuration table 312 as input, the process 1000 proceeds to step 1002 where the user modifies the product features. A key determinant of whether or not a feature satisfies a customer need and budget is the price of the feature. Therefore, at step 1004, the feature is priced and displayed as the user makes selections. Because any system may have complex interplay between parts, a validation step must be executed any time the user selects a new system feature. Thus, at step 1006 the process 1000 queries whether the configuration is valid. Examples of validation logic are prerequisite parts that must be on the system for a feature to function, parts that are mutually exclusive, allowed upgrade paths, available card and device slots, etc. If step 1006 is answered negatively, the method 1000 returns to step 1002. Once a valid configuration is generated, the process 1000 proceeds to step 1008 and queries the user for acceptance. If the user does not accept the configuration, the method 1000 returns to step 1002. By iterating through the configuration tool, the user builds the complete configured system desired. Once a valid configuration is accepted by the user, the configured system table 314 is output. The configured system table 314 includes the complete information necessary to bill the user and manufacture the system.

FIG. 10 shows one embodiment of a record 1010 of the configured system table 314. The record 1010 comprises several key data elements including a user entry 1012, a system detail entry 1014, a total price entry 1016 and a manufacturing input entry 1018. The user is the same user as in other process steps to ensure continuity throughout. The system detail is the detailed list of parts to build the system in the form of model numbers, part numbers, features, etc. System detail is a detailed and complete list of features to build the system from. The total price is the price the user can expect to be invoiced. Manufacturing input is any additional information manufacturing may need, such as special card placement, software preloads, etc.

Figure 11:
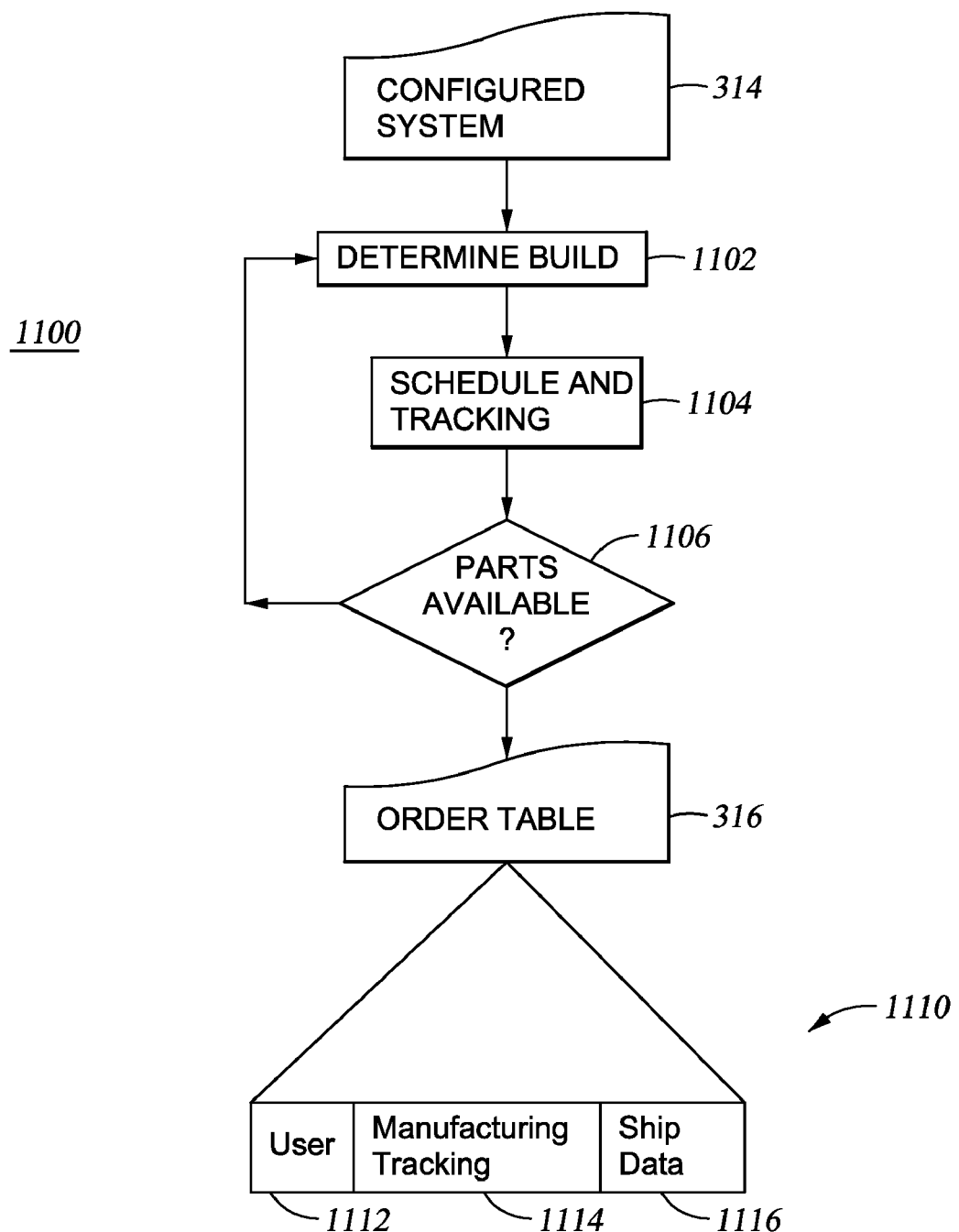
FIG. 11 is an illustrative order process to build and communicate successful order acceptance.

FIG. 11 shows one embodiment of an order process 1100 implementing the order function 206. The order process 1100 defines the necessary steps to build and communicate successful order acceptance. Using the configured system table 314 as input, the method 1100 first determines manufacturing steps necessary to build the configured system at step 1102. At step 1104, manufacturing resources are scheduled and tracking numbers are assigned. At step 1106, the method 1100 queries whether the parts are available. If not, the method 1100 returns to step 1102. If the parts are available, the method 1100 outputs the order table 316.

One embodiment of a record 1110 contained in the order table 316 is shown in FIG. 11. The order table record 1110 comprises several key data elements including a user entry 1112, a manufacturing tracking entry 1114 and a ship data entry 1116. The user entry 1112 includes, for example, the destination shipping address. The manufacturing tracking entry 1114 includes tracking numbers useful in tracking the status of the order through manufacturing. The ship data entry 1116 includes such things as tracking numbers that can be used for tracking shipments through common carriers.

For purposes of illustration, a series of graphical user interfaces (GUIs) are described below. The GUIs display relevant information to users and provide fields for user input. In the illustrative embodiment, the GUIs are Web based and accessible through Web browsers executing on the customer systems 106. The GUIs may be stored anywhere on the supplier system 105 and/or may be dynamically generated in response to requests. It is understood that the GUIs are merely illustrative and that any variety of additional or modified user interfaces are contemplated as embodiment of the present invention.

Figure 12:
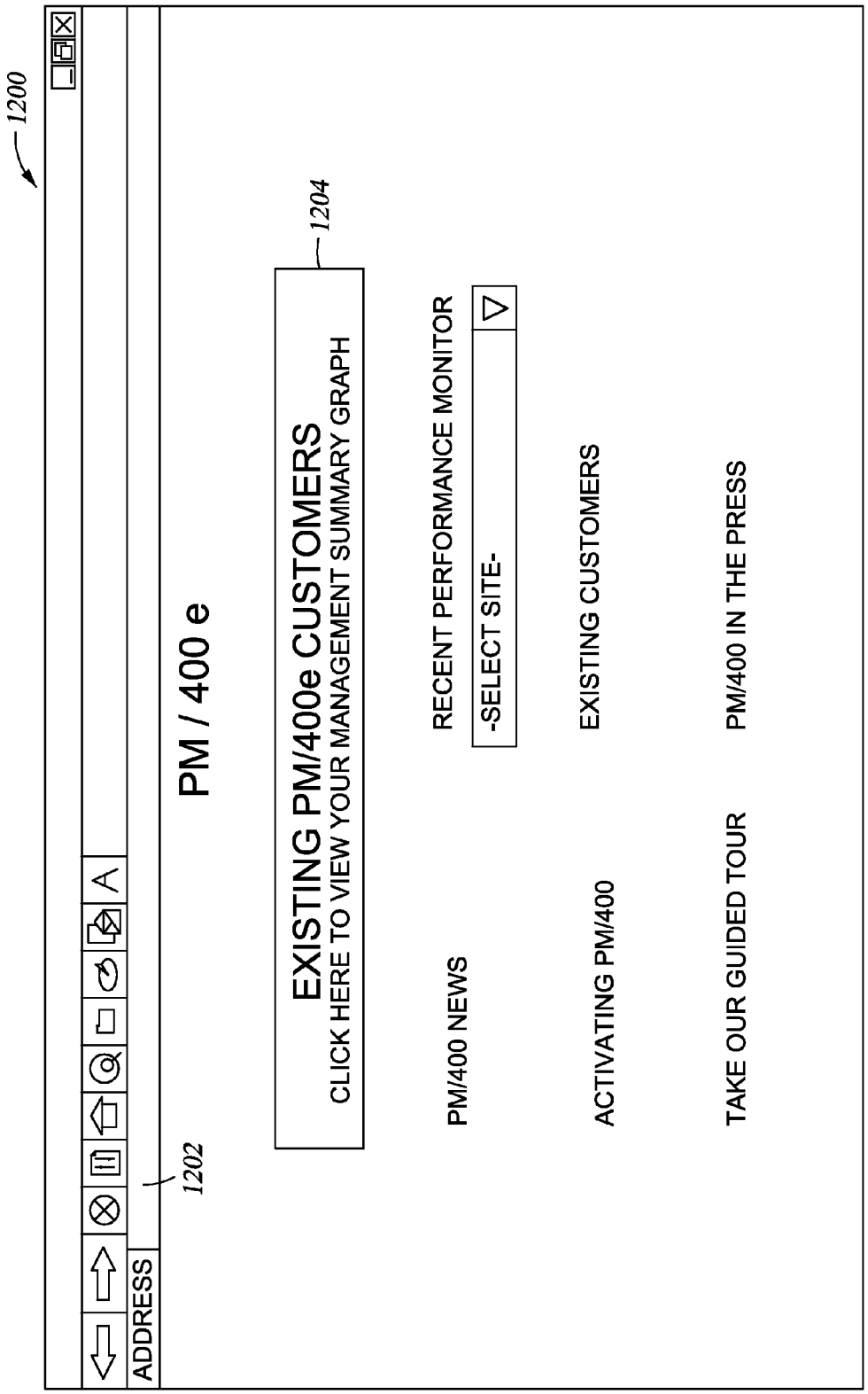
FIG. 12 is a graphical user interface of a homepage for a customer system supplier.

FIG. 12 shows a GUI 1200 provided to a user accessing the uniform resource locator (URL) specified in the address field 1202. In this case, the URL is for a web site maintained by IBM. In general, the GUI provides an owner/customer a view of information relating to the collection of data by the agent 108. For example, instructions are provided relating to activating the agent 108, verify the agent 108 is working, and sending data to the supplier system 105. This information is accessible via a plurality of hyperlinks represented as some descriptive text. Information is generally divided between two categories, one for existing owner/customers and one for potential owner/customers. Existing owner/customers have the ability to view machine data relating to one or more of the computer systems 106 after the data has been processed by the supplier system 105 by clicking a button 1204.

Figure 13:
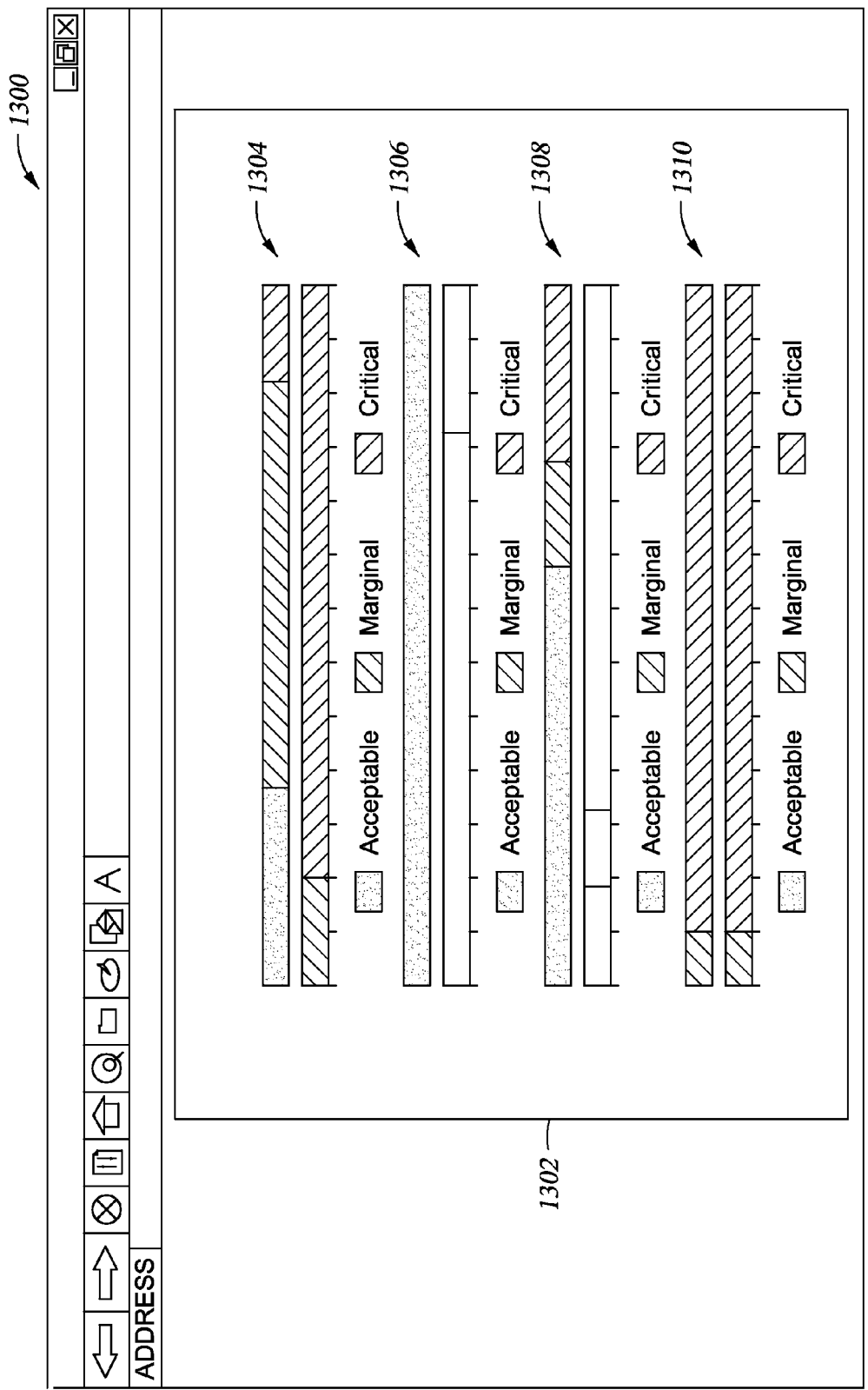
FIG. 13 is a graphical user interface formatted to show trends based on historical data.

One example of processed data machine data (contained in the history tables database 118) which may be viewed by a user is shown in FIG. 13. FIG. 13 shows a GUI 1300 containing a management summary document 1302. The management summary document 1302 provides a graphical overview of the owner/customers computer system data after it has been processed and formatted by the supplier system 105 and after it is married with other history data to project trends based on growth. Illustratively, three categories of projections are provided: a processor-interactive capacity category 1304, a processor-system interactive category 1306, a processor-total category 1308, and a disk space category 1310. Each projection falls into one of three categories (acceptable, marginal, or critical) based on guidelines for the specific model of computer system collected. Thus, management summary document 1302 allows a owner/customer to determine a current usage profile and a projected profile.

Figure 14:
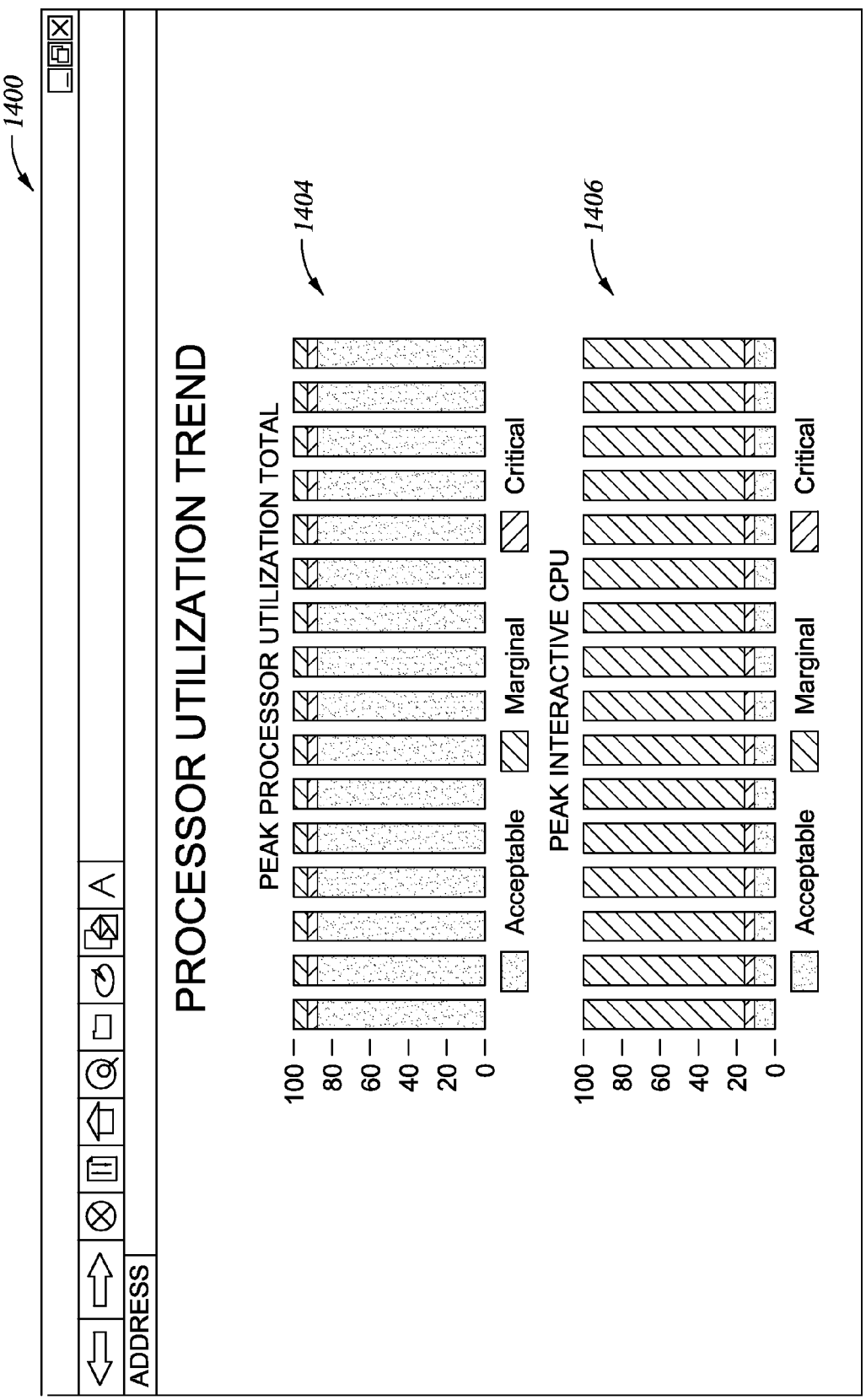
FIG. 14 is a graphical user interface detailing trend and history information in a graphical format.

The overview provided by the management summary document 1302 may be reduced to its particular details. For example, a GUI 1400 shown in FIG. 14 displays a document 1402 containing bar graphs 1404 and 1406 that provide additional details for the management summary document 1302. Specifically, the document 1402 graphically represents a specific resource (e.g., Total Processor Utilization), its history data, and a 3 month projection based on growth using the actual computer systems data. Again, the information is formatted (e.g., color-coded) to visualize acceptable, marginal, or critical performance and whether the guideline for that specific computer system is being exceeded.

Figure 15:
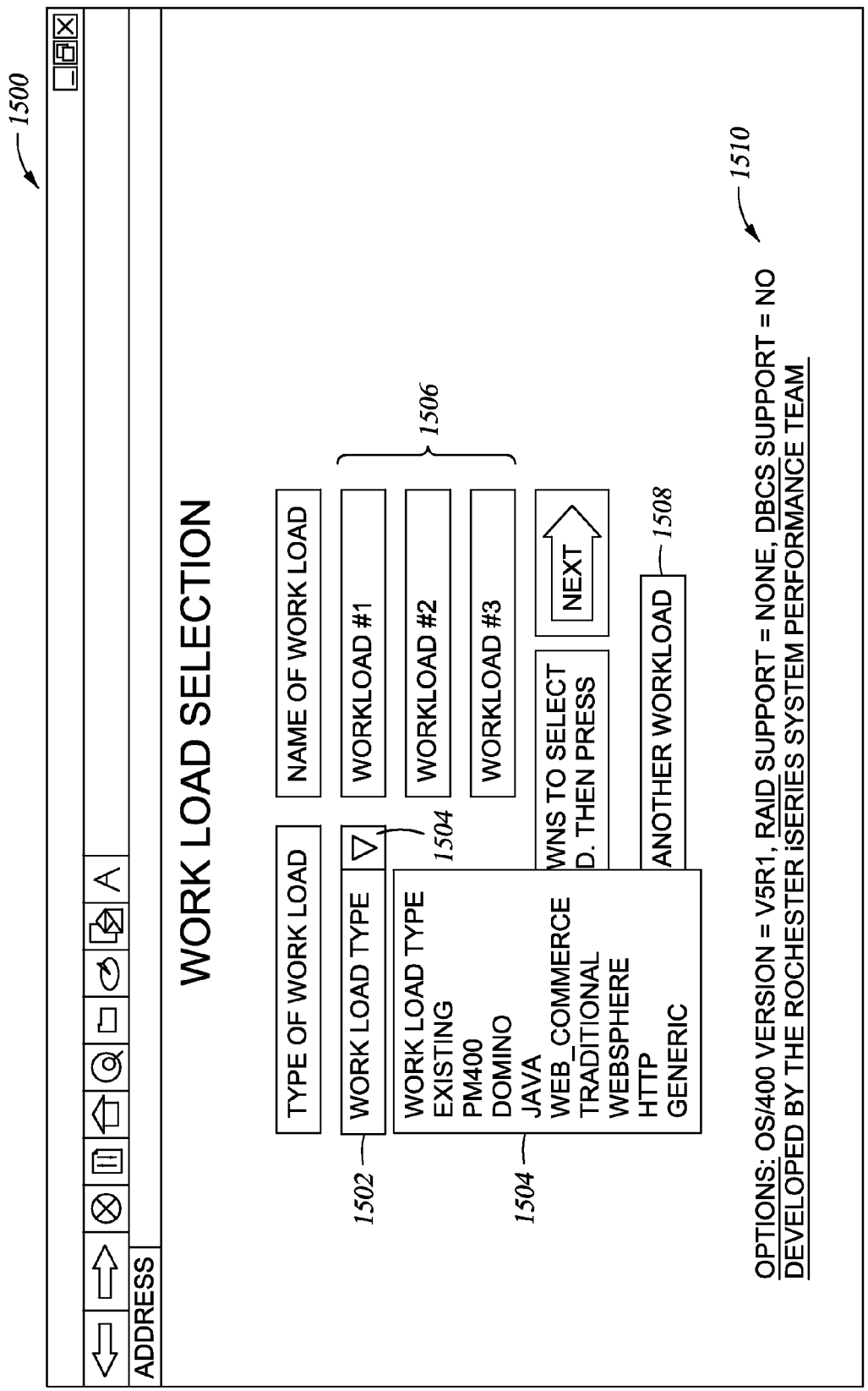
FIG. 15 is a graphical user interface illustrating a workload selection page.

FIG. 15 shows a system sizer input screen 1500. The screen 1500 is configured to allow a user to make workload selections, which is then used by the system sizer 116 for initial analysis and sizing. A type of workload is specified by a user in a first field 1502. A pulldown menu 1504 is made available by clicking a button 1504. The pulldown menu 1504 provides a plurality of workload types for selection by the user. Examples of workload types include Domino, Java, Web Commerce, Traditional, WebSphere, HTTP, Existing, PM400 and a generic workload. Each workload is given a name which is input to a name field 1506. Illustratively, three name fields 1506 are shown. Default workload names are assigned to each workload. A user can then assign a unique name to each selected workload. Once a workload type has been selected and given a name, the user may click on a button 1508 to configure another workload. The screen 1500 also displays settings 1510 for some of the options that affect the calculations performed in the sizing. Once a desired number of workload have been configured and any options have been selected, the user clicks on a "next" button 1510 to move to the next system sizer screen.

FIG. 16 shows a GUI 1600 for viewing and customizing information provided in a solution table representing historical data. In general, the GUI 1600 is divided into two areas: a system information portion 1602 and a growth information portion 1604. The system information portion 1602 shows the characteristics of a system for which the historical data was provided. Illustrative information includes a name of the entity owning the system, a serial number of the system, a system model number, an interactive feature of the system, a percentage of the overall CPU consumed and computing capacity of the processor (referenced as "System CPU"), a percentage of interactive computing capacity consumed and the interactive computing capacity of the system (referenced as "Interactive CPU"), the number of processors in the specified model, amount of memory (RAM) installed on the system, the utilization percentage and number of disk arms installed on the system, the number of the each type (i.e., 7200 RPM, 10k RPM, etc.) of disk arm currently installed on the system (referenced as "Disk Arms Distribution") and amount of data storage consumed, percentage of disk storage consumed and total disk storage installed on the system (referenced as "Disk Storage").

The growth information portion 1604 includes information that will be used in calculating future system resource needs. System sizer projections will be based on the Months to Growth field 1606. Each of the resource categories 1608 has a growth trend field 1610A-F associated with it. This trend shows the rate of change for the particular category after one month. With regard to the memory growth trend field 1610F, the growth rate can be specified to grow like a selected category in the "Memory Matches" column 1612.

Figure 17:
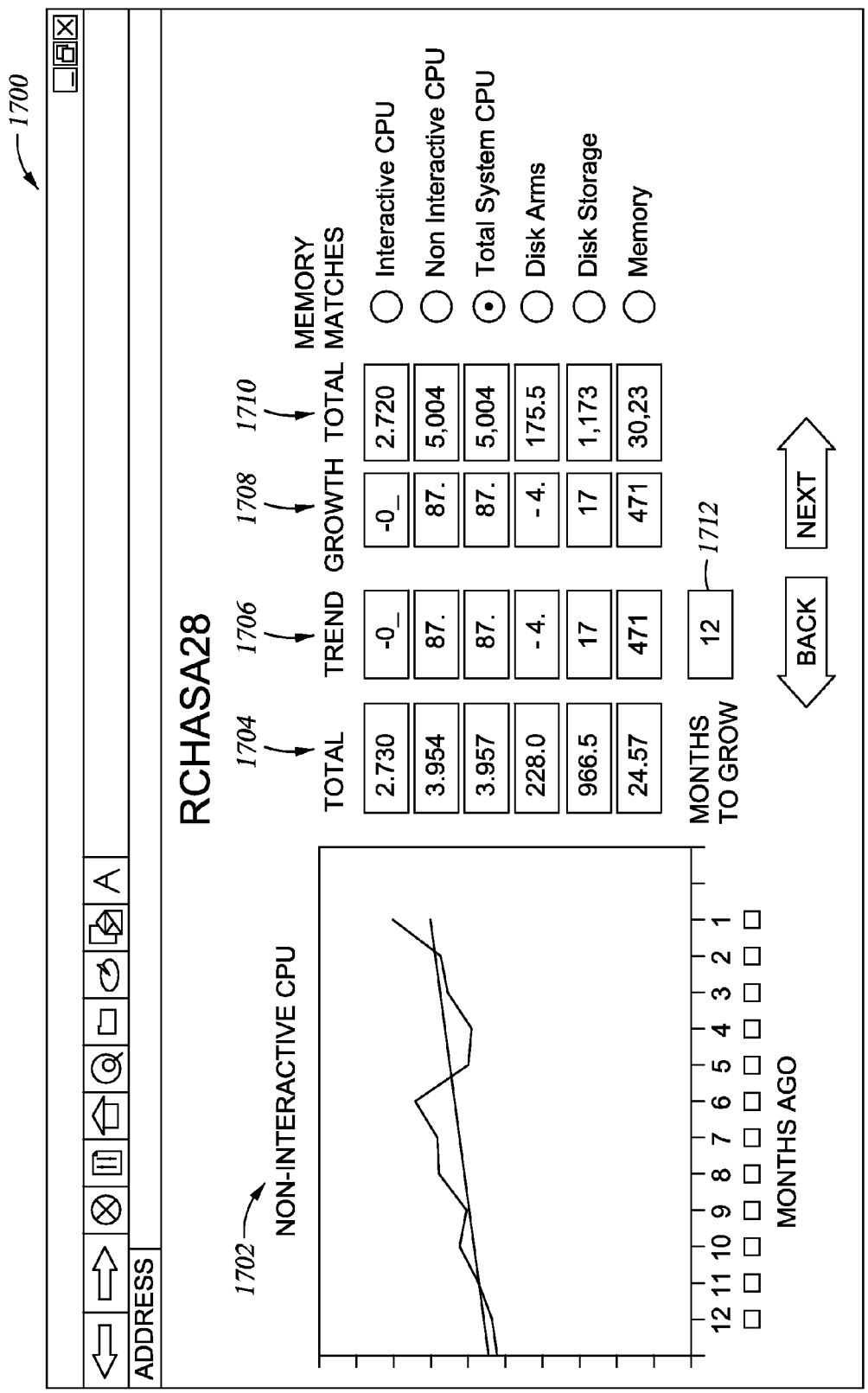
FIG. 17 is a graphical user interface illustrating an advanced growth options page.

FIG. 17 shows an advanced growth options GUI 1700. The GUI 1700 allows a user to view trends in their system performance and set future growth rates to be used in system sizing calculations. Graphs can then be displayed with information about system usage. Illustratively, a graph showing "Non-interactive CPU" is shown. Other categories for which graphs may be displayed include interactive CPU, total system CPU, disk arms, disk storage and memory. In each case, historical system statistics are shown allowing exclusion of any or all months in calculating a trend. For each category, a current total column 1704, a current trend column 1706, a future growth column 1708 and a future total column 1710 are shown. The current total column 1704 indicates how much is currently being used for a particular category. The current trend column 1706 indicates a trend (e.g., average increase/decrease) in usage per month. The future growth column 1708 indicates the intended future growth rate per month. The future total column 1710 indicates how much will be required at the future time. This is affected by the number of months specified in the Months to Growth field 1712.

Figure 18:
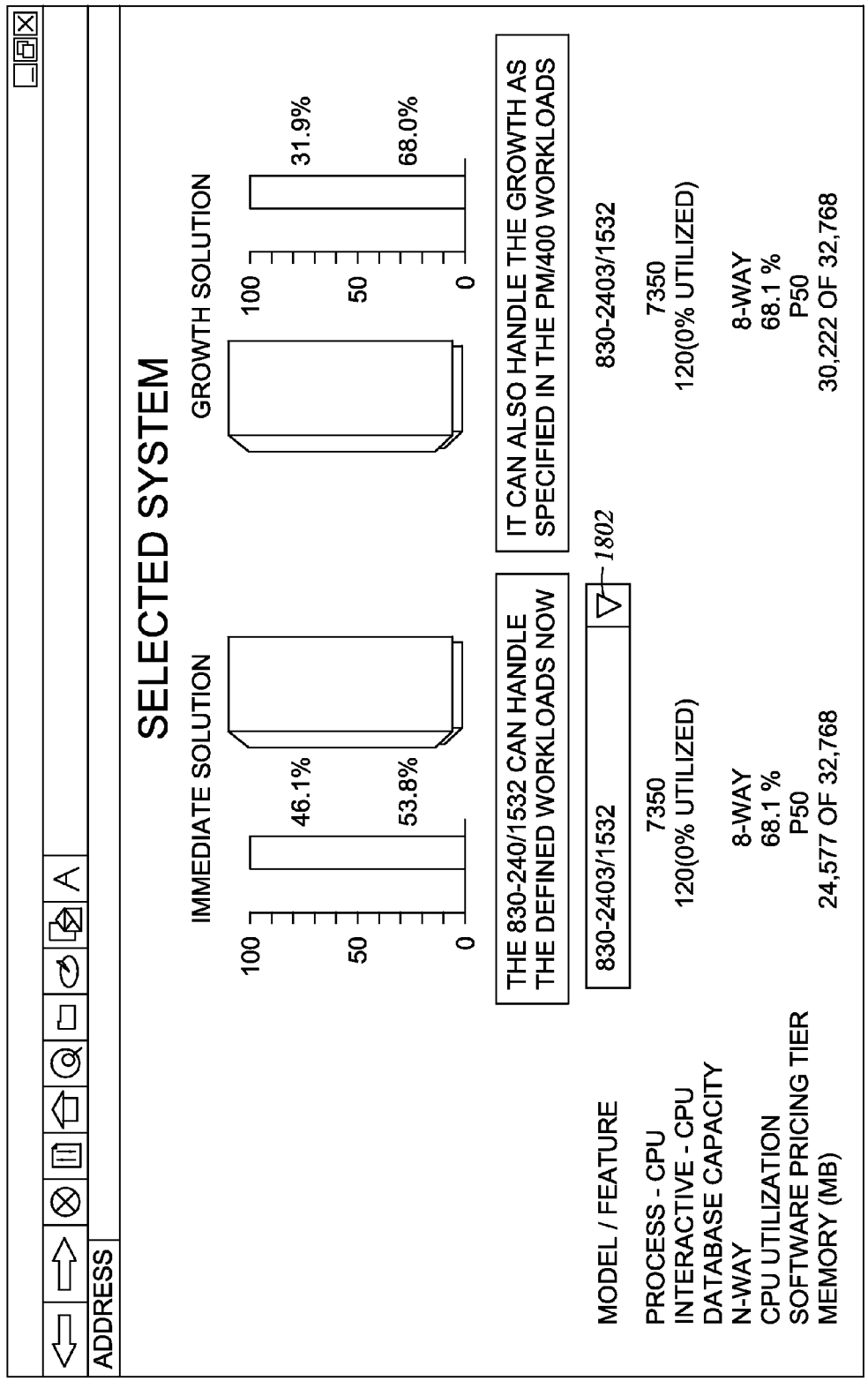
FIG. 18 is a graphical user interface illustrating a recommendation page.

FIG. 18 shows a system recommendation GUI 1800. The GUI 1800 contain system recommendation information resulting from the recommend table and which will be passed to the comparison tool 202. Illustratively, from the set of all computer systems capable of supporting the specified workload, one system is shown (indicated as "immediate solution"). Additionally, a system adapted to the growth trend is shown (indicated as "growth solution"). The system information which may be displayed to the user for each solution includes model/feature, processor CPW, interactive CPW, database capacity, N-Way, processor utilization, software pricing tier and memory. The model/feature information is the selected system identification. Clicking a drop-down menu button 1802 provides a menu of all models capable of performing the specified work. The processor CPW is the computing capacity of the processor and the interactive CPW is the computing capacity of the processor with interactive applications and percentage of that capacity used. The database capacity is the percentage of the overall CPU to used perform database processing. The N-Way is the number of processors in this model. Processor utilization is the percentage of overall CPU consumed by the workloads defined. Software pricing tear is an ID of a group determining pricing for software and support. The memory indicates the amount of memory and (RAM) required and the maximum amount the system supports.

FIG. 19 shows illustrative comparison screen 1900. This user interface is configured to receive the base recommendation on system parameters and allow examination of the product line to determine suitable solutions that meet the specified requirements. The comparison data contained in the comparison screen 1900 is then input to the configuration tool 204. Illustratively, a list 1902 of acceptable systems is shown. The systems in the list 1902 are characterized by a plurality of system features/parameters columns 1904, each capable of being modified by the user. Because part of the illustrative recommendation is an upgrade, an existing system descriptor 1906 for the system that will be upgraded is also displayed.

The capabilities to display (the columns 1904) can be changed by the user to expose additional information about the systems or hide information not important to the user. As an example, FIG. 20 shows a screen 2000 indicating features of the existing system (referenced by "830_2403_1532") and an upgraded system (referenced by "830_2403_1533"). The screen 2000 displays the machine type model and specifications for insertion into the Configurator process.

Figure 21:
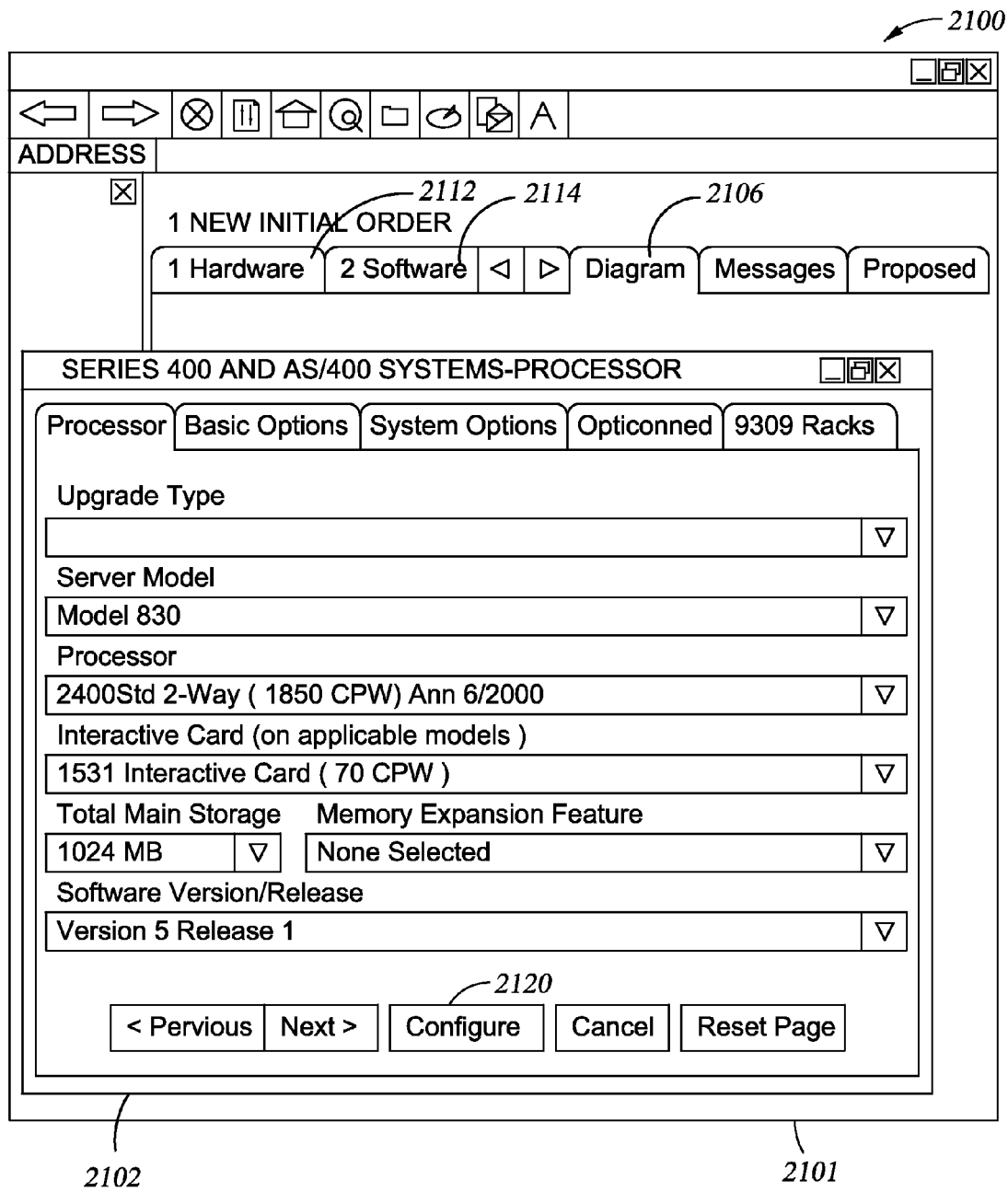
FIG. 21 is a graphical user interface illustrating a configuration page.

FIG. 21 shows an illustrative configuration screen 2100. The configuration screen 2100 shows a background window 2101 and a foreground window 2102. The foreground window 2102 displays current system options to choose from. Across the top of the window 2102, tabs 2104 can expose additional features to choose from. The background window 2101 provides additional tabs 2106. Activating a "proposed" tad 2108 displays the feature detail and price of the complete system. A slot and system diagram can be seen under the "Diagram" tab 2110. The "Hardware" tab 2112, "Software" tab 2114, and related tabs broaden selections even further. At a lower end of the foreground window 2102, a "Configure" button 2120 can be clicked to force validation.

The information contained in the configuration screen 2100 is then provided to the order process 206. An exemplary order entry screen 2200 is shown in FIG. 22. The order entry screen 2200 displays a detailed list of features, a quantity for each item, a part number, unavailability indication, itemized pricing and a subtotal invoice amount. If desired, a user may remove one or more of the items and recalculate the subtotal.

Accordingly, systems and methods are provided for increased accuracy of product use by automatically collecting machine data, automatically passing this data to servers available to customers and other users, condensing a historical view of this information to be fed into a workload estimator that determines the appropriate size of machine needed, allowing the user to modify this history to adjust for forecasted changes in how the product may be used in the future and allowing the user to describe basic changes in new workloads or additional workloads they may now choose to take advantage of. Once the appropriate product upgrades have been identified, the user has the ability to place the order for the selected upgrades or the new product replacement through ordering facilities, which may be web-based. This provides the user with the ability to track, modify, extend and order product enhancements directly without the need for a product expert that was previously required even for typical product enhancements. Through the use of product description tables, additional software or hardware considerations from the same or different vendors can be added to the product upgrade model, thereby allowing third party suppliers to affect the upgrade model with their products.

It is understood that the foregoing embodiments are merely illustrative. Persons skilled in the art will recognize additional and/or alternative embodiments which are within the scope of the present invention. For example, in one embodiment recommendations are generated automatically by the supplier system 105 without an explicit request from a user. For example, the supplier system 105 may monitor the computer systems using the machine information collected therefrom. When a system is approaching capacity limits a notification is issued to an operator of the system. The notification may indicate a usage trend and indicate when a system will meet or exceed its capacity. In response to receiving the notification, the operator may take steps to upgrade/enhance the system and obviate problems associated with exceeding the system requirements.

Physical Device Placement

In one embodiment, the supplier system 105 may also be adapted to provide physical device placement information. In general, physical device placement information includes any information specifying an appropriate location and configuration of a physical computer device in a computer system. The following embodiments are directed to physical device placement information methods and systems.

Figure 23:
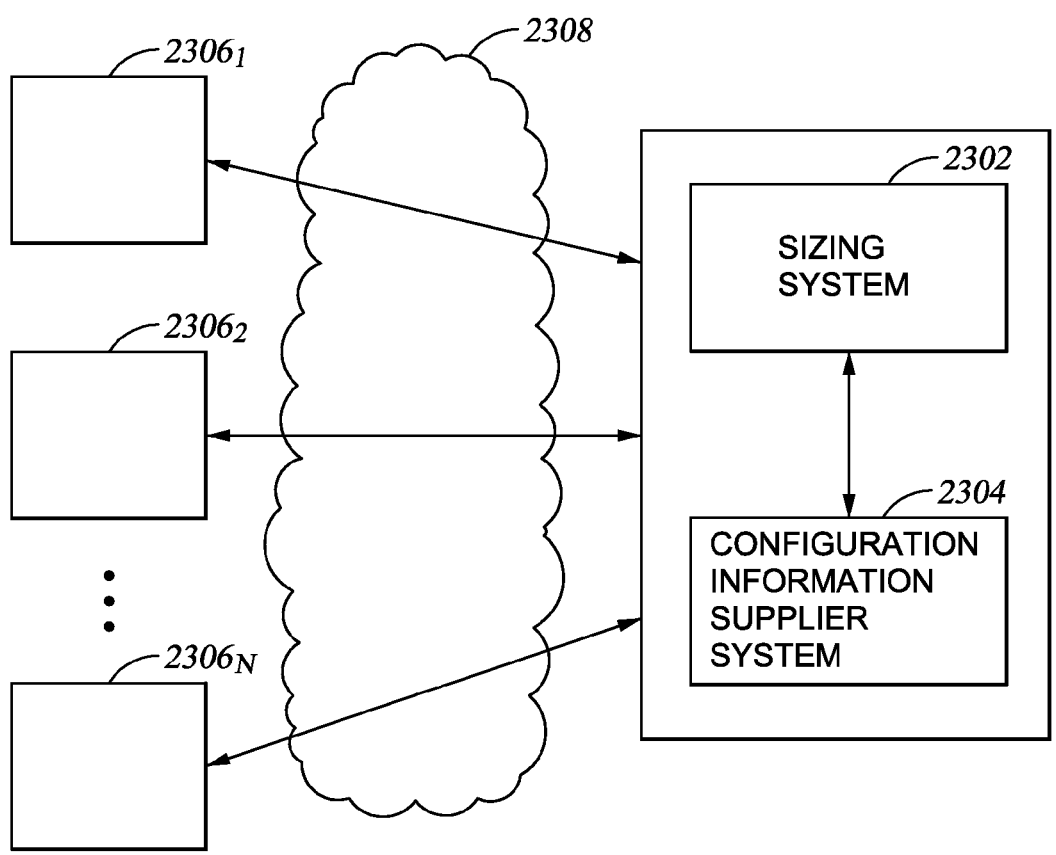
FIG. 23 is a diagram of a network environment comprising a plurality of client computers networked with a sizing system and a configuration information supplier system.

FIG. 23 shows a processing system 2300 comprising a sizing system 2302 and a configuration information supplier system 2304. The sizing system 2302 and the configuration information supplier system 2304 communicate with a plurality of client computers 2306 via a network 2308. In one embodiment, the network 2308 is the Internet. Illustratively, the sizing system 2312 is the supplier system 105 described above. Accordingly, the components of the sizing system 2302 are the same as those described above with reference to FIGS. 1-22. Embodiments of the configuration information supplier system 2304 will now be described with reference to FIGS. 24-35.

The present embodiments provide methods and systems for handling physical device placement requests. In general, a physical device placement request is any request for information pertaining to placement of a physical device (e.g., a direct access storage device and a PCI card) in a computer system.

The following embodiments are described with particular reference to upgrading/enhancing computers. However, the present embodiments are applicable to any physical devices that benefit from periodic upgrades, enhancements or reconfiguration.

Figure 24:
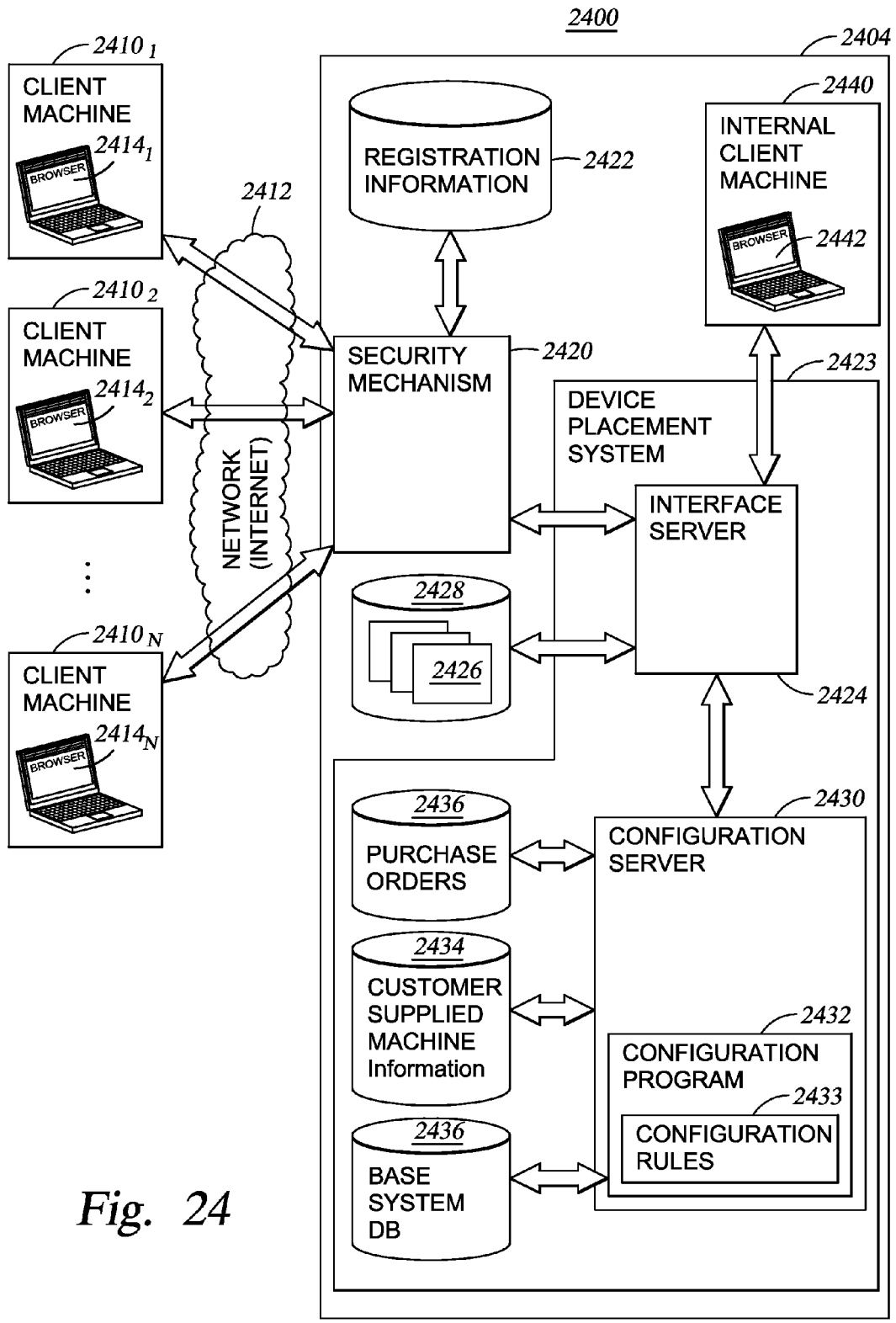
FIG. 24 is an architecture diagram of one embodiment of a physical device placement system.
Figure 25:
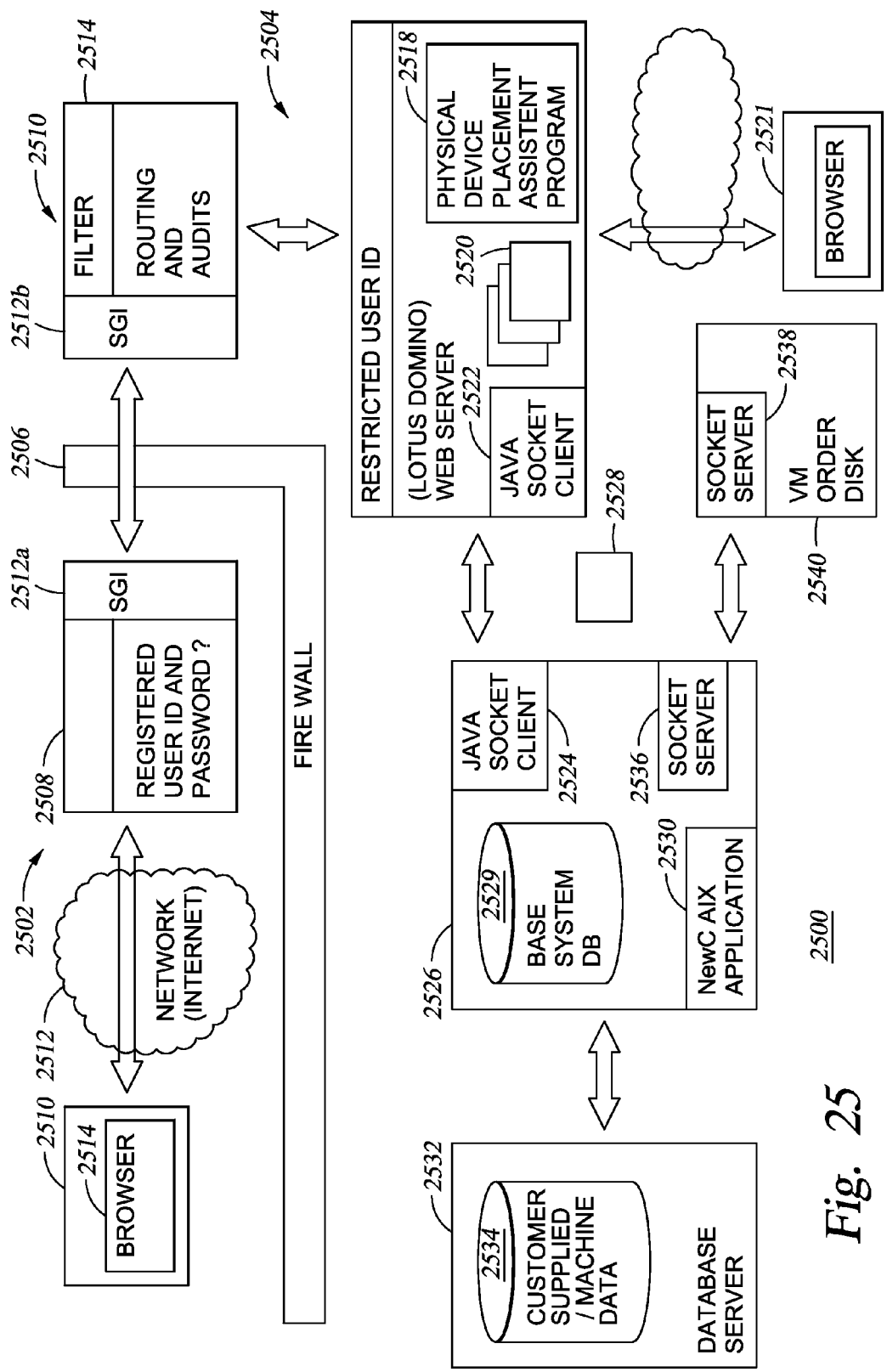
FIG. 25 is an architecture diagram of another embodiment of a physical device placement system.

FIGS. 24 and 25 show embodiments of configuration information data processing systems 2400 and 2500, respectively. The configuration information data processing systems 2400 and 2500 are also referred to herein as "system 2400" and "system 2500", respectively. The system 200 may be understood as a particular embodiment of the system 2400. Accordingly, in some cases similar terms are used in describing FIGS. 24 and 25 to indicate similar components. In one embodiment, the systems 2400, 2500 are configured as Web based systems comprising Web servers navigable by Web browsers. As such, the systems 2400, 2500 are particularly suited for Internet implementations. However, references to Web applications and the Internet are merely for purposes of illustration and persons skilled in the art will readily recognize that embodiments contemplated herein include any networked arrangement and a method allowing access to configuration information.

Referring first to FIG. 24, the system 2400 generally includes a plurality of external client computers $2410_1$, $2410_2$, ... $2410_N$ (collectively referred to herein as "external client computers 2410") and a configuration information supplier system 2404 (also referred to herein as "supplier system 2404"). A network connection is established between the external client computers 2410 and the supplier system 2404 through a network 2412 (also referred to the "external network"). The network 2412 may be any local area network (LAN) or wide area network (WAN) capable of supporting the appropriate information exchange according to embodiments provided herein. In a particular embodiment, the network 2412 is the Internet.

Each external client computer 2410 is shown configured with a browser 2414 (only one shown) to allow for navigation of network addresses, including the network address of the supplier system 2404. Illustratively, the browser 2414 is a Web browser.

At a front end, the supplier system 2404 includes a security mechanism 2420. The security mechanism 2420 may be any combination of hardware and software configured to restrict access to the supplier system 2404. In one embodiment, access may be restricted to register users. Accordingly, the supplier system 2404 includes a registration information database 2422 which is used by the security mechanism 2420 to authenticate users requesting access to the supplier system 2404. The registration information database 2422 may include usernames, user IDs, user physical addresses, user e-mail addresses, user passwords and the like.

The security mechanism in communication with a device placement system 2423. In general, the device placement system 2423 comprises an interface server 2424 and a configuration server 2430. The interface server 2424 is configured to format interfaces in response to a user request (e.g., from the external client computer 2410). The interfaces 2426 are stored as a series of electronic documents in an interface database 2428. Illustratively, the interfaces 2426 are graphical user interfaces (GUI) comprising a number of fields which may be populated with information provided by a configuration server 2430 or by information provided from a user, e.g., via a browser 2414.

The configuration server 2430 (also referred to herein as the "physical device placement server") may be any machine comprising a configuration program 2432 which, when executed, performs a hardware device placement process according to a request received from an external client computer 2410. The rules for performing the hardware device placement process and generating a meaningful output is contained in a rules file 2433. The rules file 2433 contains current configuration and placement information (also referred to herein as rules) for a plurality of devices. The rules are specific to a plurality of machines, which may be identified by machine type and model. For each specific machine, the rules identify where a hardware device (e.g., PCI and DASD) is placed and various circumstances regarding the placement. One example of a rules is the proper distribution of DASD devices under PCI media adapters for a specified level of protection. Another example is the distribution of PCI LAN adapters under PCI controller adapters for optimized performance. The rules file 2433 may be periodically updated to ensure accurate information.

The information used by the configuration server 2430 (and specifically the configuration program 2432) to process a request is contained in a plurality of databases. In one embodiment, the databases include a customer machine information database 2434, a purchase order database 2436 and a base system information database 2438.

The customer machine information database 2434 contains customer supplied information about specific computers. For each particular computer, such information may include a model number, a machine type, a plant code, hardware information (e.g., for the various devices resident on the computer), software information and the like. Illustratively, the information contained in the customer machine information database 2434 may have been manually collected or automatically collected. Automatic machine information collection is well-known. For example, the AS/400 for iSeries available from International Business Machines is configured to sense and collect machine data in response to a predefined command (i.e., WRKORDINF). Regardless of the collection method, the machine data may then be transported to the supplier system 2404 and associated with a particular user during registration. In the case of the AS/400, the data is transmitted from an external client computer 2410 in response to a user-initiated command, i.e., the WRKORDINF command. It should be noted that that the customer machine information may be specific to a machine different from the machine used to later invoke the hardware device placement process of the present embodiments.

The purchase orders database 2436 provides a repository for pending purchase orders (also referred to herein as "Miscellaneous Equipment Specifications" (MES)). Each purchase order may be referenced by a purchase order number. Each purchase order may contain order content specifying a part(s) to be added to an existing machine. For example, the order content may include part names, a part number, a machine type, a serial number and other identifying information.

The base system information database 2438 contains "templates" for a variety of different systems. Each template defines the specification of a particular system. The templates allow a user to perform "what if" scenarios for various devices using the same base system information or for various base systems using the same device.

In one embodiment, device configuration requests may also be submitted from an internal client computer 2440. The internal client computer 2440 executes a browser (e.g., a Web browser) in order to communicate with the interface server 2424. However, because the internal client computer 2440 resides "behind" the security mechanism 2420, a user of the internal client computer 2440 may not be subject to the same restriction requirements as a user of the external client computers 2410.

In operation, the configuration information supplier system 2404 responds to requests for configuration/placement information of hardware devices. Such devices may include, for example, PCI cards and DASDs. The requests are submitted from registered users by either the external client computers 2410 or the internal client computers 2440. In the former case, users are subject to an authentication process as implemented by the security mechanism 2420. For example, a user may be required to provide a user ID and password.

Submission of requests is facilitated by providing users the interfaces 2426 via the interface server 2424. The interfaces 2426 may include one or more request interfaces comprising a number of fields. The interfaces are transmitted to the browser 2414 and a user then inputs required information into the fields and submits the information to the supplier system 2404. Illustrative embodiments of a graphical user interface configured for submission of a configuration request are described below with reference to FIGS. 4-29.

A request received by the supplier system 2404 is then forwarded to the configuration server 2430 for processing. In particular, the configuration program 2432 operates to retrieve the appropriate information from the rules file 2433, while the configuration server 2430 retrieves information from the databases 2434, 2436 and/or the base system database 2438. The particular information retrieved will depend upon the nature of the request. In one embodiment, requests include machine-specific requests, base system requests and a purchase order number request. These requests will be described in more detail with reference to FIGS. 30-34 below. Regardless of the request type, steps are taken by the configuration server 2430 to associate the appropriate information from the databases 2434, 2436 and 2438 and output the information to the interface server 2424. The information is then transmitted to the user for display via the browser 2414, 2442.

Referring now to FIG. 25, the system 2500 generally includes an external environment 2502 and a configuration information supplier system 2504 (also referred to herein as "supplier system 2504"). The external environment 2502 and a supplier system 2504 may be separated by an information access partition 2506. Generally, the information access partition 2506 may be any combination of hardware and software. Illustratively, the information access partition 2506 is a firewall.

The external environment 2502 includes an external server 2508 and a plurality of external client computers $2510_1$, $2510_2$, ... $2510_N$ (collectively referred to herein as "external client computers 2510"). In general, the external server 2508 is configured to prompt a user for a user ID and password as previously specified during a registration time. A network connection is established between the external server 2508 and the external client computers 2510 through the network 2512. The network 2512 may be any local area network (LAN) or wide area network (WAN) capable of supporting the appropriate information exchange according to embodiments provided herein. In a particular embodiment, the network 2512 is the Internet. The external client computer 2510 is shown configured with a browser 2514 to allow for navigation of network addresses, including the network address of the external server 2508. Illustratively, the browser 2514 is a Web browser and the external server 2508 is a Web server.

The external server 2508 communicates with an internal server 2510 residing on an opposite side of the partition 2506. Illustratively, communication between the external server 2508 and the internal server 2510 is maintained by a Secure Gateway Interface (SGI) connection supported by SGI interfaces 2512a-b. A connection is established only after a user has been authenticated by the external server 2508. Following authentication, the internal server 2510 may filter and redirect network address requests to prevent users from accessing unauthorized databases or network addresses and from determining the internal directory structure of the configuration information supplier system 2504. These and other security features may be implemented by a filter program 2514.

Configuration requests are transmitted from the internal server 2510 to a technical support Web server 2516. Illustratively, the Web server 2516 is a Lotus Domino Web server. The Web server 2516 hosts a physical device placement assistant application 2518 and a plurality of electronic documents 2520. The electronic documents 2520 contained graphical user interface placement information, diagrams, charts and the like. The physical device placement assistant application 2518 allows users to access the Web server 2516 without being prompted for additional user identification information (e.g., user ID and password), while restricting access to the electronic documents 2520 via, e.g., reader fields. As the electronic documents 2520 are created by the physical device placement assistant application 2518, reader fields within each document are tagged with the user ID of the requester. In this manner, access to the electronic documents 2516 is limited to the appropriate user.

In addition to servicing requests from the external client computers 2510, the Web server 2516 also services requests from internal users, as represented by the internal client computer 2521. The internal client computer 2521 may be any computer residing inside the firewall 2506, i.e., on the same side as the Web server 2516.

Regardless of the original source of a configuration request, the requests are forwarded from the Web server 2516 to a physical device placement assistant hub 2526. The Web server 2516 maintains a connection with the physical device placement assistant hub 2526 via a Java socket client 2522 residing on the Web server 2516 and a Java socket server 2524 residing on the hub 2526. Transmission of data between the socket client 2522 and the socket server 2524 is in the form of a uniquely defined socket server interface file 2528. One embodiment of the interface file 2528 is described below with reference to FIGS. 26A-26B.

Once a request is received by the physical device placement assistant hub 2526, steps are taken to prepare a response. In particular, an input order is prepared by the hub 2526 and then provided to a configuration program 2530. Illustratively, the configuration program 2530 is NewC, available from International Business Machines, Inc. for iSeries and pSeries hardware. The input order is prepared to using data provided from one of a plurality of sources. Illustrative sources include a base system information database 2529 (managed by the hub 2526), customer/machine supplied database 2534 (managed by a database server 2532) and a VM order minidisk 2540 (containing purchase orders/MES orders). A request to the database server 2532 may be in the form of an SQL query submitted via a Java JDBC through DB2 client access enabler (CAE) connection. Communication between the hub 2526 and the VM order minidisk 2540 is made via a socket connection maintained by a socket client 2536 residing on the hub 2526 and a socket server 2538 residing on the VM order minidisk 2540. Once prepared, the response is sent to the requester via the interface file 2528.

One embodiment of the interface file 2528 is described with brief reference to FIG. 26A-26B. FIG. 26A shows a format of the interface file 2528 when input to the configuration server 2430 and is referenced as interface file 2528A.

FIG. 26B shows a format of the interface file 2528 when output from the configuration server 2430 and is referenced as interface file 2528B. In general, the interface file 2528A-B is defined as a plurality of columns and rows. Illustratively, the interface format is a physical device placement assistant format. The format consists a key/value pairs that represent a current system configuration. Accordingly, the interface file 2528A-B comprises a key column 2602 and a value column 2604. A description column 2606 is also provided and contains an intuitive description of the key/value pair. The collective entries of a particular row define a record of the interface file 2528. A sixth record 2608 of the interface file 2528 contains a first character string 2610A-B and a second character string 2612. The first character string 2610A-B is representative of "new" or customer supplied data (i.e., data supplied in a present request) whereas the second character string 2612 is representative of "old" data (data previously provided by a user/machine and now retrieved from a data repository, e.g., the database 2534). The information type (i.e., old or new) is indicated by a first character, "N" and "O", in the character strings. In the case of the first character string 2610A-B, the input interface file 2528A contains a representation of the customer supplied data (a feature code) which is converted into a different format in the output interface file 2528B.

FIGS. 4-6 show illustrative embodiments of graphical user interfaces (GUIs) configured for facilitating a configuration request. In particular, the GUIs are illustrative of the electronic documents 2426 (FIG. 1) and/or the electronic documents 2520 (FIG. 2). Referring first to FIG. 27, a GUI 400 is shown. The GUI 2700 comprises a search selection window 2702. The search selection window 2702 provides user selectable search options. Illustratively, the search options include a machine specific search, a base system search, and an MES search. In this case, a machine specific search has been selected. As a result of the selection, the GUI 2700 provides a plant code field 2704, a serial number entry 2706, a machine field entry 2708 and a user type field 2710. Once the appropriate information has been selected or entered the user may submit the request by clicking on the "Submit System Information" button 2712.

Figure 29:
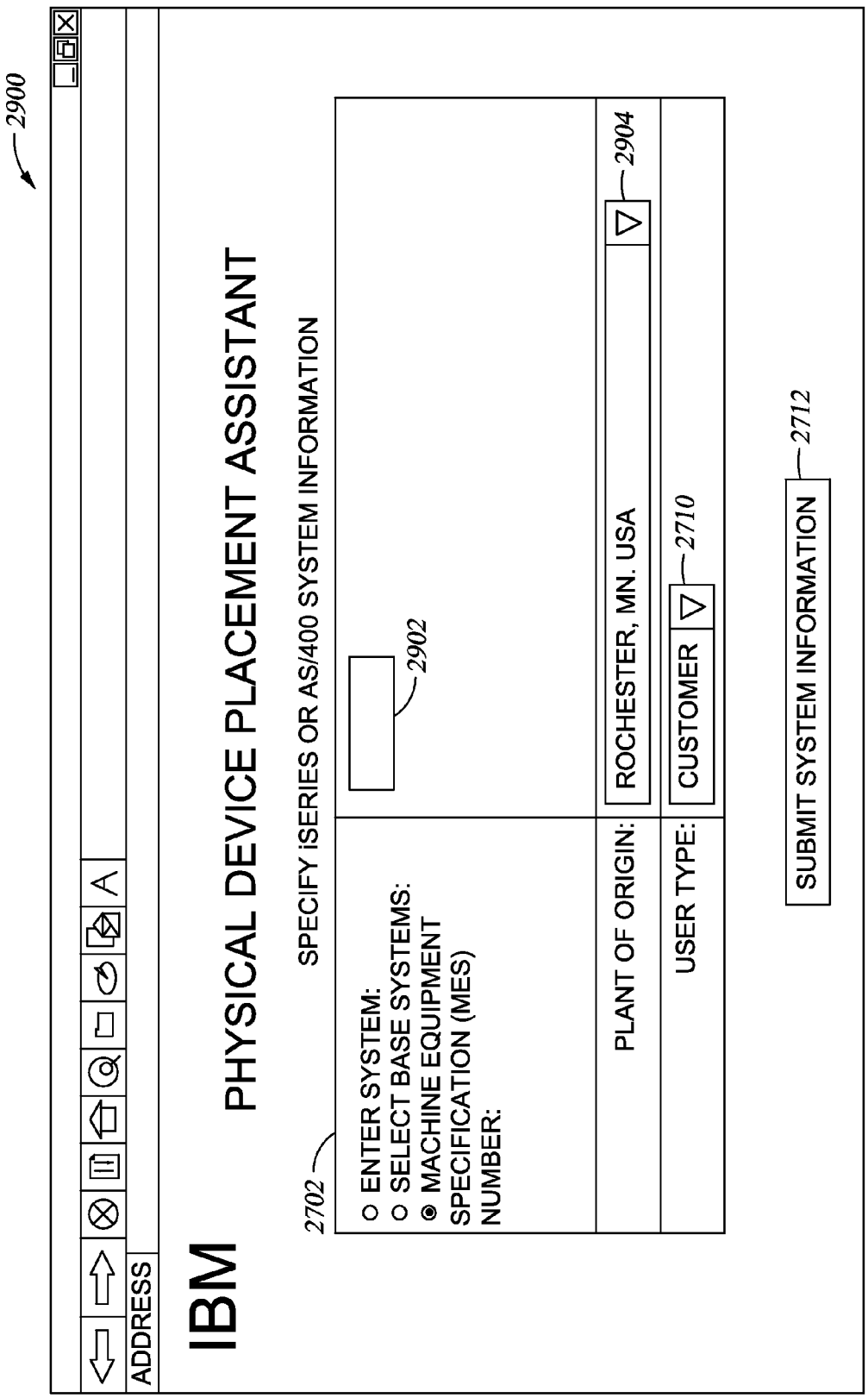
FIG. 29 is an illustrative graphical user interface configured for input of a purchase order number.

FIG. 5 shows a GUI 2800 configured for a base system configuration request. In this case, the GUI 2800 includes a base system field 2802. A GUI 2900 configured for an MES search is shown in FIG. 29. In this case, the GUI 2900 includes an MES number field 2902 and a "plant of origin" field 2904.

Figure 30:
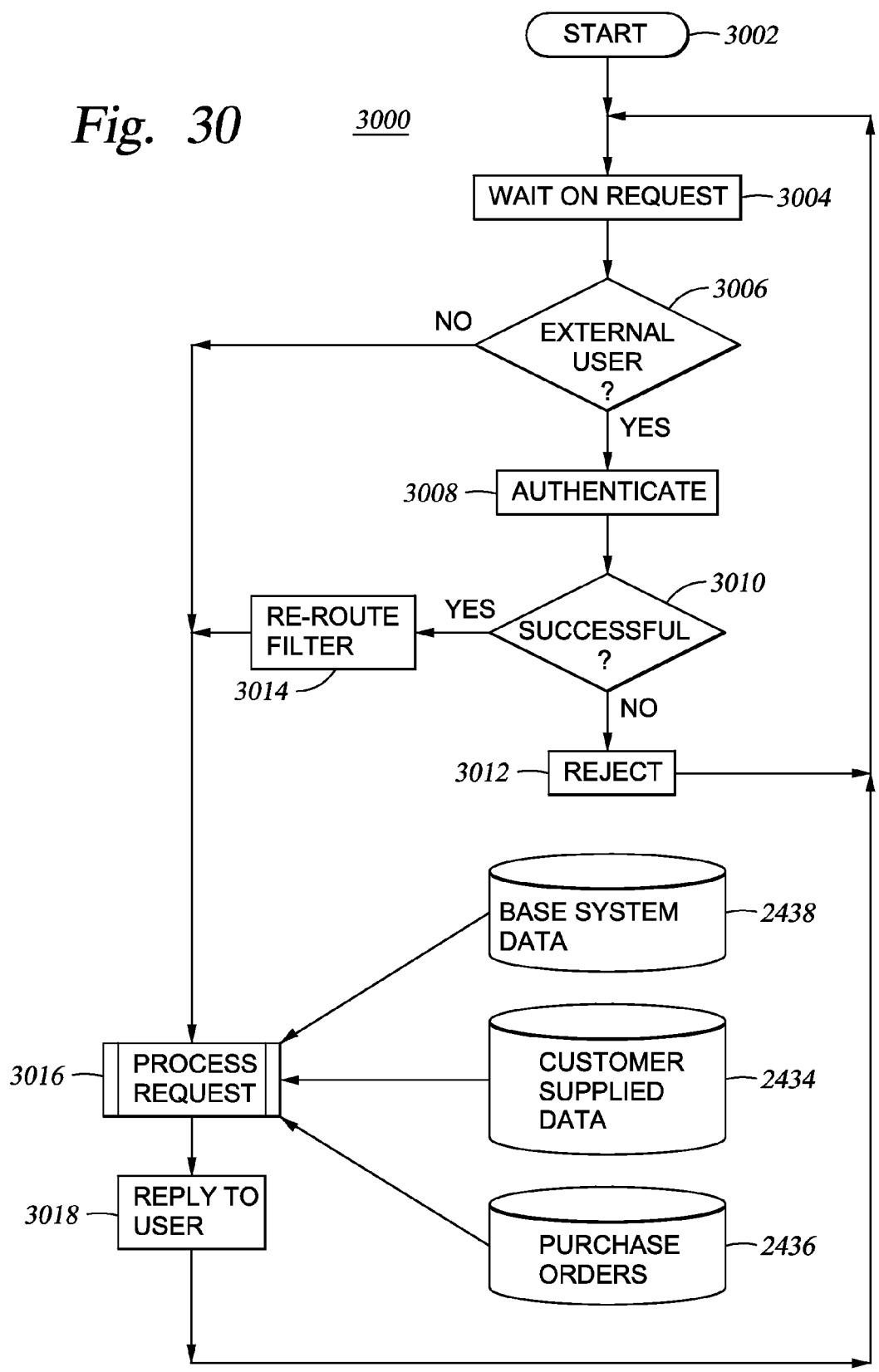
FIG. 30 is a flowchart illustrating a method for handling device placement requests.
Figure 31:
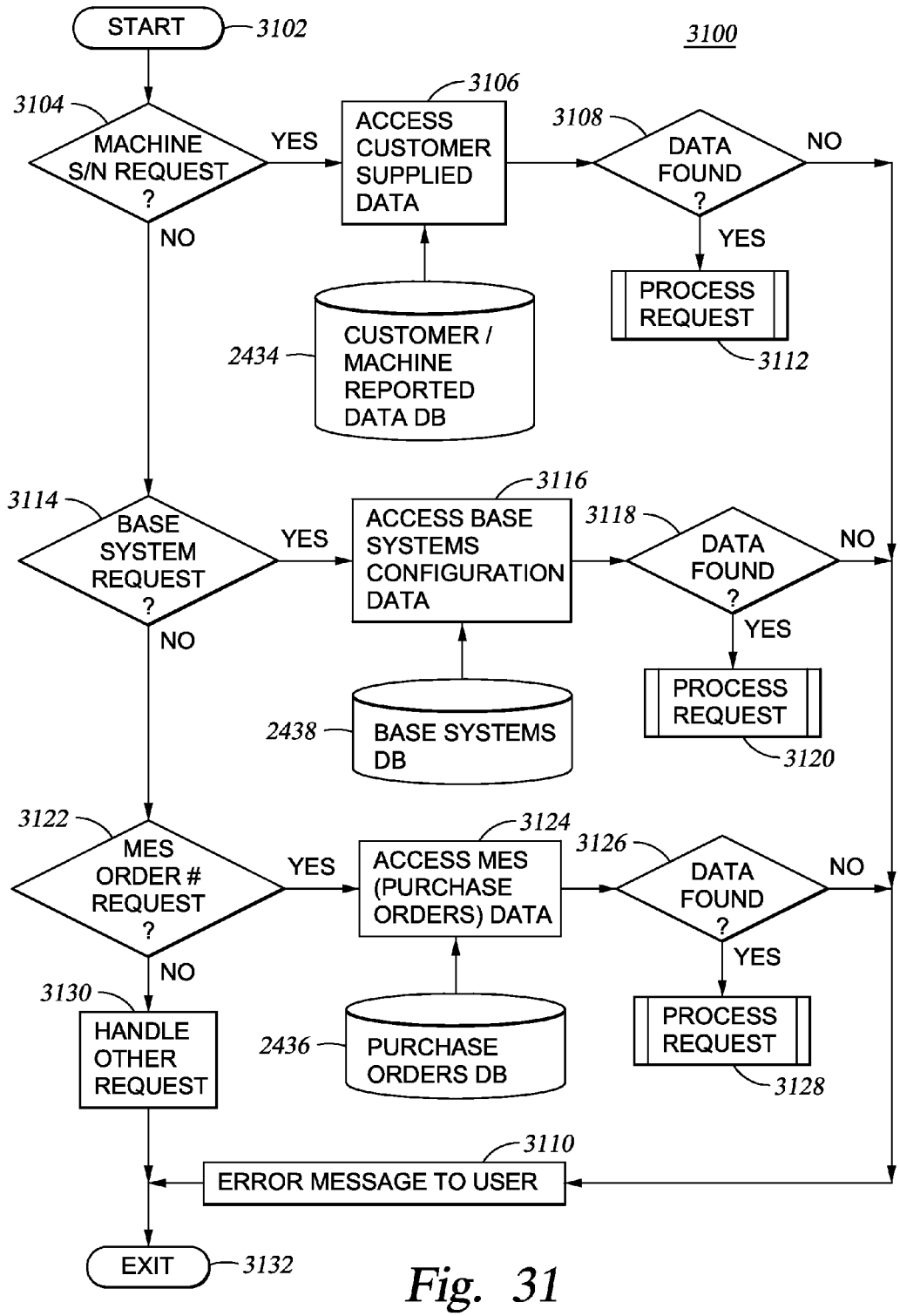
FIG. 31 is a flowchart illustrating a method for handling device placement requests introduced in FIG. 7.
Figure 32:
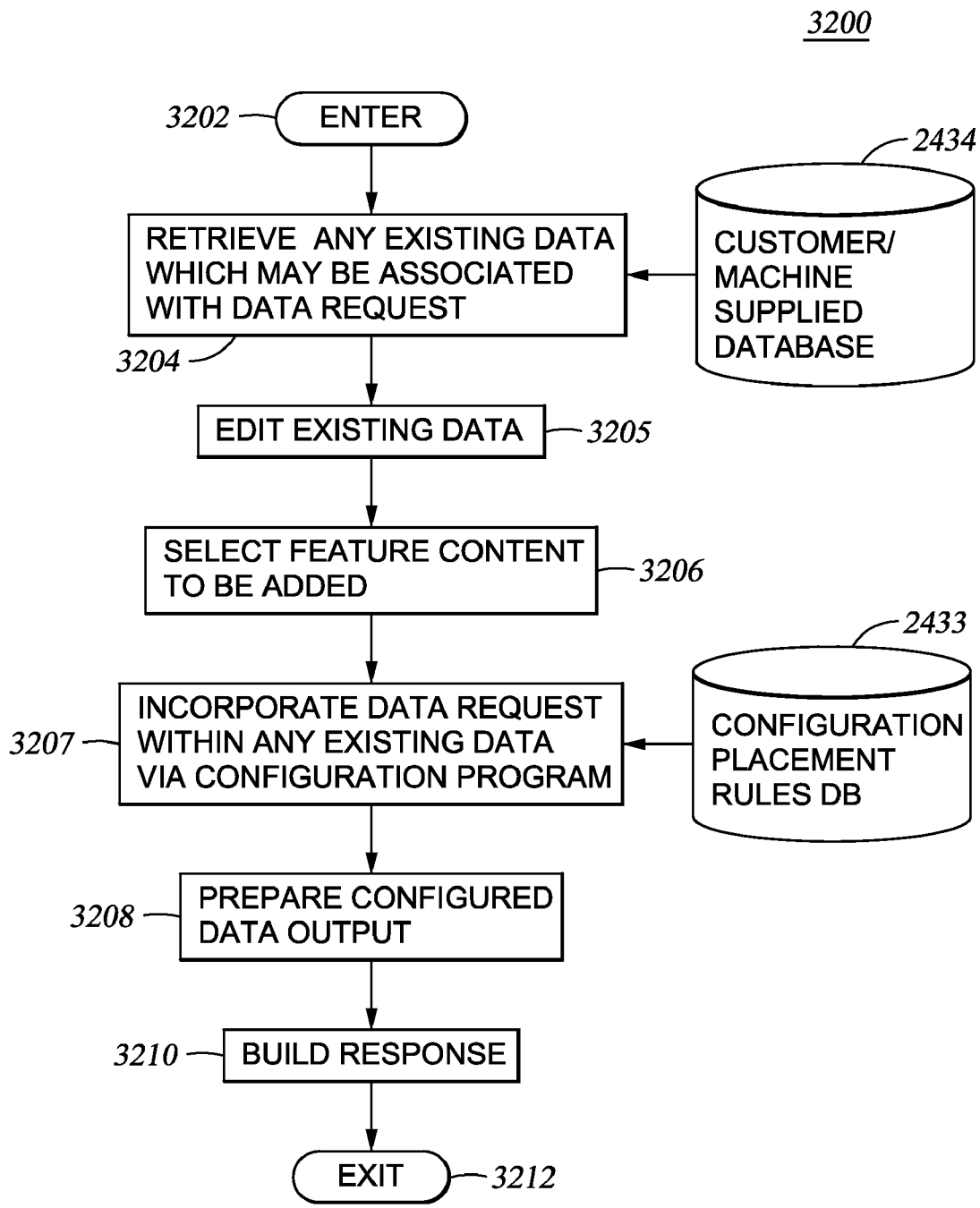
FIG. 32 is a flowchart illustrating a method for handling a machine specific device placement request using customer supplied data.
Figure 33:
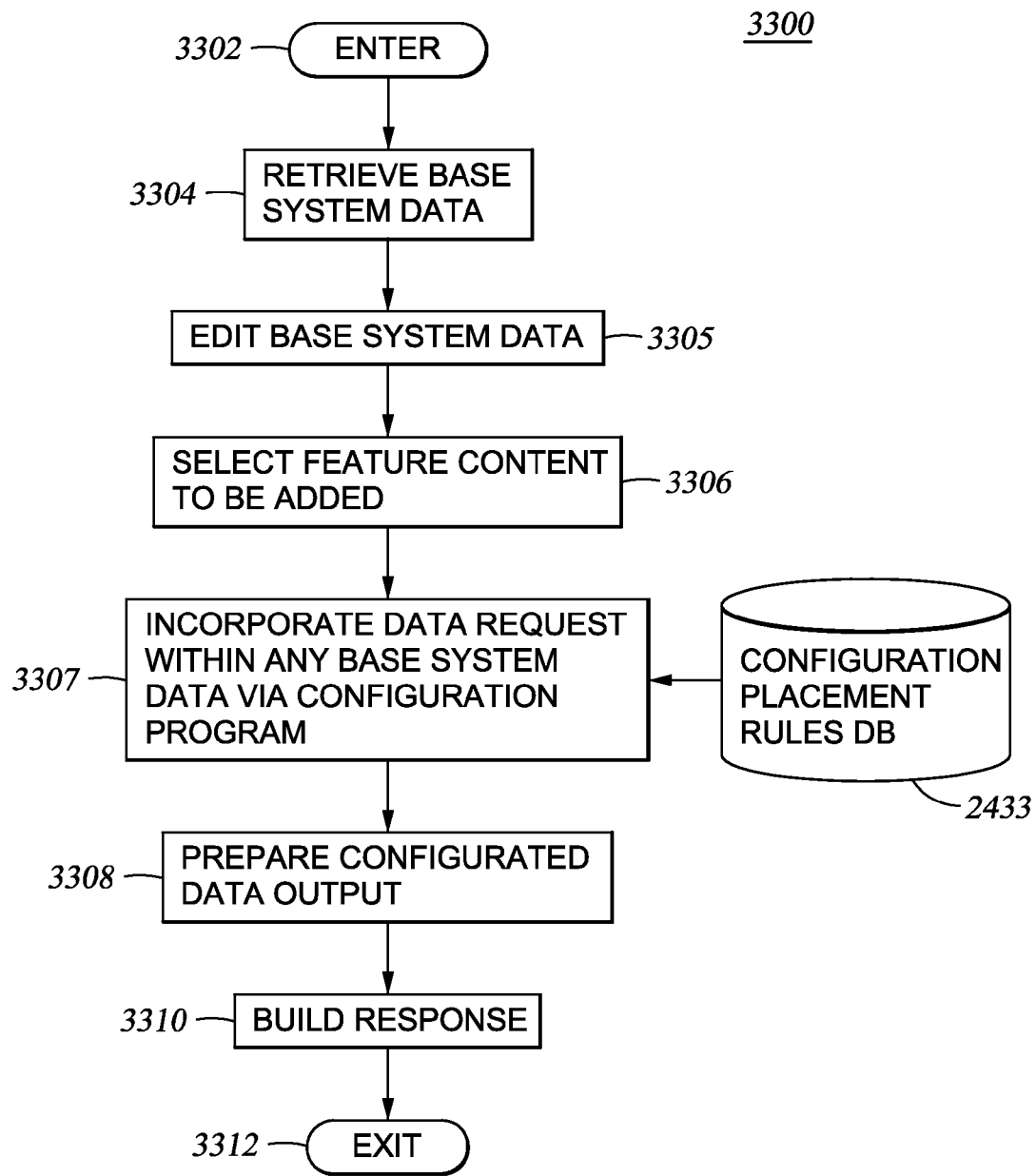
FIG. 33 is a flowchart illustrating a method for handling a base system request type.
Figure 34:
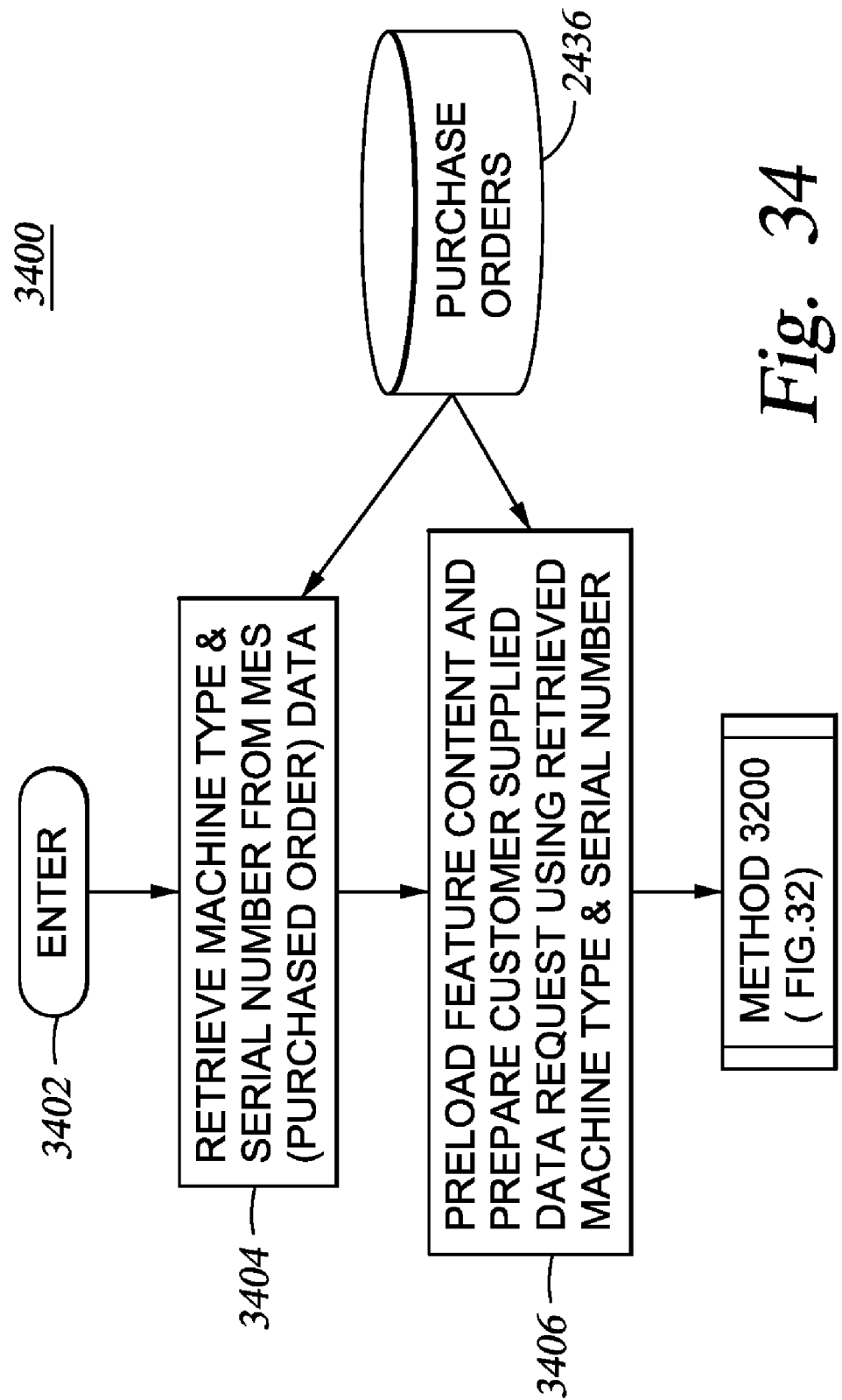
FIG. 34 is a flowchart illustrating a method for handling a purchase order request type.

Referring now to FIG. 30, a method 3000 is shown illustrating steps taken to process a configuration/placement request. In one embodiment, the method 3000 may be understood as illustrating the operation of the systems 2400 and 2500. Accordingly, reference may be made to FIGS. 24 and 25 where appropriate. For brevity and simplicity, reference to FIG. 24 is emphasized. However, person skilled any art will recognize where the following steps are applicable to the system 2500 described with reference to FIG. 25.

Method 3000 is entered at steps 3002 and proceeds to step 3004 to wait on a request. Once a request is received, the method 3000 proceeds to step 3006 and queries whether the request is from an external user. If so, steps are taken to first authenticate the user. Accordingly, the method 3000 proceeds to step 3008 where authentication takes place. At steps 3010, the method 3000 queries whether the authentication was successful. If not, the request is rejected at steps 3012 in the method 3000 returns to step 7 of 4 to wait on another event. If, however, the authentication is successful the method 3000 proceeds to step 3014 where the request may be rerouted and filtered. The request is then processed according to the particular request type at step 3016. Depending on the request type, one or more of the databases 2434, 1246 and 2438 are accessed. At step 3018, a response is submitted to the requester. The method 3000 then returns to step 3004 to wait on another event.

FIG. 8 shows a method 3100 for processing various request types at step 3016. Method 3100 is entered at step 3102 and proceeds to step 3104 to query whether the request is a machine specific request. That is, a determination is made as to whether a user has submitted a machine type, a plant code and a serial number. If so, the customer/machine supplied database 2434 is accessed at step 3106. At step 3108, the method 3100 queries whether data was found for the particular machine. If the user has not previously provided the data been no data is located at step 3108 and an error message provided to the user at step 3110. If the appropriate data is located at step 3108, the method 3100 proceeds to step 3112 where a response is prepared. One embodiment of step 3112 is described below with reference to FIG. 32.

Returning to step 3104, if the request is not for a specific machine the method 3100 proceeds to step 3114 and queries whether the request is a base system request. If so, the method 3100 proceeds to step 3116 to access the base system database 2438 in an attempt to locate the appropriate data. At step 3118, the method queries whether the data was located. If not, an error message is provided to the user at step 3110. Otherwise, the method 3100 proceeds to step 3120 where a response is prepared. One embodiment of step 3120 is described below with reference to FIG. 33.

Returning again to step 3114, if the request is not a base system request the method 3100 proceeds to step 3122 and queries whether the request is an MES order number request. If so, the purchase orders database 2436 is accessed at step 3124 in an attempt to locate the appropriate data. At step 3126, the method 3100 queries whether the data was located. If not, the requester is provided with an error message at step 3110. Otherwise, the method 3100 proceeds to step 3128 to prepare a response. One embodiment of step 3128 is described below with reference to FIG. 34.

If steps 3104, 3114 and 3122 were each entered negatively, the method 3100 proceeds to step 3130 to handle other request types according to predefined rules. Examples of requests which may be handled at step 3130 include requests to view help information, display error messages, jump to other Web pages view hyperlinks, etc. The method 3100 then exits at step 3132.

FIG. 9 shows one embodiment of the processing occurring at step 3112. The method 3200 is entered at step 3202 and proceeds to step 3204 to prepare any existing data which may be associated with the data request. Such data includes any information retrieved from the customer/machine reported database 2434. At step 3205, the user is given the opportunity to edit the existing data. At step 3206, the user may select additional feature content. At step 3207, the existing data (including any edits an/or additional features) is combined with the new data submitted by the user in the current request. This combination of data is handled by the configuration program 2432 which makes use of configuration placement rules contained in the rules file 2433. The configured data output is prepared at step 3208 and a response is built at step 3210. The user may then choose to iterate the foregoing steps or exit at step 3212.

FIG. 10 shows a method 3300 illustrating the processing occurring at step 3120 (i.e., handling of a base system request). Base system requests handled by method 3100 allow a user to perform "what if" scenarios. As such method 3300 may be iterated for various devices using the same base system information or for various base systems using the same device. The method 3300 is entered at step 3302 and proceeds to step 3304 where the base system data is prepared. At step 3305, the user is given the opportunity to edit the existing data. At step 3306, the user may select additional feature content. At step 3307, the existing data (including any edits an/or additional features). Using the configuration placement rules the base system data is incorporated with the data supplied by the current request at step 3306. The configured data output is prepared at step 3308 and a response is built at step 3310. The method 3300 then exits at step 3312.

FIG. 11 shows a method 3400 illustrating the processing occurring at step 828 (i.e., handling of an MES order number request). The method 3400 is entered at step 3402 and proceeds to step 3404 to retrieve the machine type and serial number from the purchase order database 2436 according to the user specified MES order number. At step 3406, feature content is preloaded and a request is prepared using the retrieved machine type and serial number. In particular, data may be retrieved from the customer supplied database 2434. In this manner, a machine specific request is created without requiring the user to input the machine type and serial number. Accordingly, the request prepared at step 3406 may be handled according to method 900 described above with reference to FIG. 32.

For each configuration request type, a response containing configuration and placement information is returned to the user. FIG. 35 shows one embodiment of a GUI 3500 configured with placement information in response to an MES type request. In particular, the GUI 3500 indicates the placement of a new 2749 IOA PCI card (obtained from the MES order content) within the second 5074 frame (obtained from the customer/machine supplied data) on the system specified by the particular machine type, model and serial number.

While the foregoing is directed to embodiments of the present invention, other and further embodiments of the invention may be devised without departing from the basic scope thereof, and the scope thereof is determined by the claims that follow.

What is claimed is:

1. A method of operating a computerized system to provide computer recommendation information, comprising:
generating an operation profile for a computer using machine performance information specific to the computer and obtained from the computer, wherein the machine performance information is generated by the computer and comprises a plurality of performance metrics related to the operation of the computer, wherein the operation profile indicates at least a usage trend for the computer comprising a growth rate of at least one of the plurality of performance metrics during a first time interval;
determining projected computer system requirements based on the usage trend for the computer, wherein the projected computer system requirements indicate an amount of system resources sufficient to support a workload specified by the usage trend; and
generating a recommendation of system resources, which satisfies at least the projected requirements.

2. The method of claim 1, wherein generating the recommendation comprises processing system requirements specifications reflecting a desired future use of the computer.

3. The method of claim 1, wherein generating the recommendation comprises returning web based content to a web client.

4. The method of claim 1, further comprising receiving a purchase order for the at least one computer system solution.

5. The method of claim 1, wherein generating the recommendation comprises processing system requirements specifications selected by a user from a plurality of system options available at a network address.

6. The method of claim 5, wherein the plurality of system options are provided by a plurality of third party solution providers.

7. The method of claim 1, further comprising configuring the at least one computer system solution to indicate system specifications and a price.

8. The method of claim 7, further comprising:
providing product options and associated prices to a user for selection;
receiving a product option selection from the user for at least one of the product options; and
outputting a starting configuration for the at least one computer system solution.

9. The method of claim 8, further comprising:
receiving a configuration selection from the user to modify the starting configuration;
determining whether the configuration selection is valid; and
if so, producing a configured system viewable by the user.

10. The method of claim 9, further comprising receiving a purchase order for the configured system.

11. The method of claim 1, further comprising:
allowing a user to modify the recommendation to produce a modified computer system solution;
configuring the modified computer system solution to indicate system specifications and a price; and
receiving a purchase order for the configured modified computer system solution.

12. The method of claim 1, wherein the recommendation of system resources comprises a computer system specification.

13. A system for generating recommendation information for computer devices, comprising:
a machine information collection system configured to receive machine performance information for a plurality of computers and obtained from a plurality of computers, wherein the machine performance information is generated by the plurality of computers and comprises a plurality of performance metrics related to the operation of the plurality of computers;
a history database containing statistical information generated using the machine performance information, wherein the statistical information indicates usage trends for system resources of the plurality of computers, each usage trend comprising a growth rate of at least one of the plurality of performance metrics during a first time interval; and
a system sizer configured to determine projected computer system requirements based on the statistical information, wherein the projected computer system requirements indicate an amount of system resources sufficient to support a workload specified by the usage trends, and to produce system recommendations of system resources, comprising at least one computer system solution, which satisfy the projected requirements.

14. The system of claim 13, wherein the system sizer is further configured to produce system recommendations using user input.

15. The system of claim 13, further comprising an order tool configured to process orders for the users for a suggested system satisfying the recommendations.

16. The system of claim 13, further comprising storage space containing third party solutions for display to the users and accessible to the system sizer, wherein the third party solutions are utilized to produce the system recommendations.

17. The system of claim 13, further comprising a web server having a network connection to the plurality of computers and configured to provide the statistical information and the system recommendations to requestors.

18. The system of claim 13, further comprising a tool configured to determine a price and a valid configuration for a system satisfying the system recommendations.

19. The system of claim 13, further comprising:
  a comparison tool configured to allow users to compare product line options capable of satisfying the system recommendations;
  a configuration tool configured to receive feature selections from the users and determine a valid configuration for a system satisfying the system recommendations; and
  an order tool configured to process orders from the users for the system.

20. A system for generating recommendation information for computer devices, comprising:
  a network connection to a network of computers; and
  a system sizer configured to determine projected computer system requirements based on statistical information of machine performance information of the computers and obtained from the computers and at least one of user input information and third-party solutions and to produce system recommendations of system resources, comprising at least one computer system solution, which satisfy the projected requirements, wherein the machine performance information is generated by the computers and comprises a plurality of performance metrics related to the operation of the computers, wherein the statistical information indicates usage trends for system resources of the plurality of computers, wherein each usage trend comprise a growth rate of at least one of the plurality of performance metrics during a first time interval, and wherein the projected computer system requirements indicate an amount of system resources sufficient to support a workload specified by the usage trends.

21. The system of claim 20, further comprising a tool configured to determine a price and a valid configuration for a system satisfying the system recommendations.

22. The system of claim 20, further comprising an order tool configured to process orders for a suggested system satisfying the system recommendations.

23. The system of claim 20, further comprising:
  a machine information collection system configured to receive machine information for a plurality of computers; and
  a history database containing statistical information generated using the machine information, wherein the machine information collection system, the history database and the system sizer are operated by a supplier of computer devices and the plurality of computers are operated by customers of the supplier.

24. The system of claim 20, further comprising:
  a comparison tool configured to allow users to compare product line options capable of satisfying the system recommendations;
  a configuration tool configured to receive feature selections from the users and determine a valid configuration for a system satisfying the system recommendations; and
  an order tool configured to process orders from the users for the system.

25. A method for providing computer purchasing recommendations for a plurality of computers, comprising:
  receiving, from the Internet, a plurality of summaries of machine performance data for each of the plurality of computers and obtained from the plurality of computers, wherein the machine performance data is generated by the plurality of computers and comprises a plurality of performance metrics related to the operation of each the plurality of computers;
  recording the plurality of summaries of machine performance in a machine performance history;
  deriving a usage trend for system resources for each of the plurality of computers based on their respective summary of machine performance data stored in the machine performance history, wherein each usage trend characterizes a future operation of the respective computer of the plurality of computers and indicates a rate of change for at least one of the plurality of performance metrics over a timed interval, the rate of change and timed interval being user-determinable;
  determining projected resource requirements for each computer of the plurality of computers based on the respective usage trend, wherein the projected computer system requirements indicate an amount of system resources sufficient to support a workload specified by the respective usage trend;
  based on the projected resource requirements, providing computer purchasing recommendations of system resources, comprising computer systems, that satisfy the projected resource requirements; and
  receiving purchase orders for the computer systems by requests sent across the Internet.

* * * * *